US010761104B2

(12) United States Patent
Brennen et al.

(10) Patent No.: US 10,761,104 B2
(45) Date of Patent: Sep. 1, 2020

(54) SYSTEMS AND METHODS FOR TRANSFERRING LIQUIDS

(71) Applicant: Agilent Technologies, Inc., Santa Clara, CA (US)

(72) Inventors: Reid A. Brennen, San Francisco, CA (US); Bo Curry, Redwood City, CA (US); Joel Myerson, Berkeley, CA (US); Paige Anderson, Belmont, CA (US); Arthur Schleifer, Portola Valley, CA (US); Rolfe Anderson, Saratoga, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 431 days.

(21) Appl. No.: 15/593,228

(22) Filed: May 11, 2017

(65) Prior Publication Data

US 2017/0328928 A1    Nov. 16, 2017

Related U.S. Application Data

(60) Provisional application No. 62/335,027, filed on May 11, 2016.

(51) Int. Cl.
*G01N 35/00* (2006.01)
*G01N 35/10* (2006.01)
*C12N 15/10* (2006.01)

(52) U.S. Cl.
CPC ..... *G01N 35/1074* (2013.01); *G01N 35/1009* (2013.01); *G01N 35/1065* (2013.01); *G01N 2035/1037* (2013.01); *G01N 2035/1039* (2013.01); *G01N 2035/1044* (2013.01)

(58) Field of Classification Search
CPC combination set(s) only.
See application file for complete search history.

(56) References Cited

U.S. PATENT DOCUMENTS

| | | | |
|---|---|---|---|
| 6,063,339 A | 5/2000 | Tisone et al. | |
| 6,101,946 A | 8/2000 | Martinsky | |
| 6,447,723 B1 | 9/2002 | Schermer et al. | |
| 8,920,752 B2 | 12/2014 | Tisone et al. | |
| 2004/0062686 A1* | 4/2004 | Ganz | B01J 19/0046 506/32 |
| 2004/0096367 A1* | 5/2004 | Schermer | B01J 19/0046 422/400 |
| 2005/0136534 A1* | 6/2005 | Austin | G01N 35/1011 435/287.2 |

* cited by examiner

*Primary Examiner* — Brian R Gordon

(57) ABSTRACT

One or more liquids are transferred from a source array to one or more remotely positioned destination sites such as chambers by utilizing one or more movable transfer elements, such as contact pins or capillaries. The source array may include a predetermined organization of addresses at which materials are positioned. One or more materials may be selected for transfer. Based on the selection, one or more addresses may be accessed by the transfer element(s). The addresses may correspond to spots on a surface of the source array. Each spot may be a feature containing one or more (bio)chemical compounds. At the chamber(s), the material (s) may be processed, such by reaction with one or more reagents. The reaction(s) may entail synthesis of one or more desired products. Alternatively, reaction(s) may be performed at the source array, and the product(s) then transferred to the chamber(s).

19 Claims, 17 Drawing Sheets

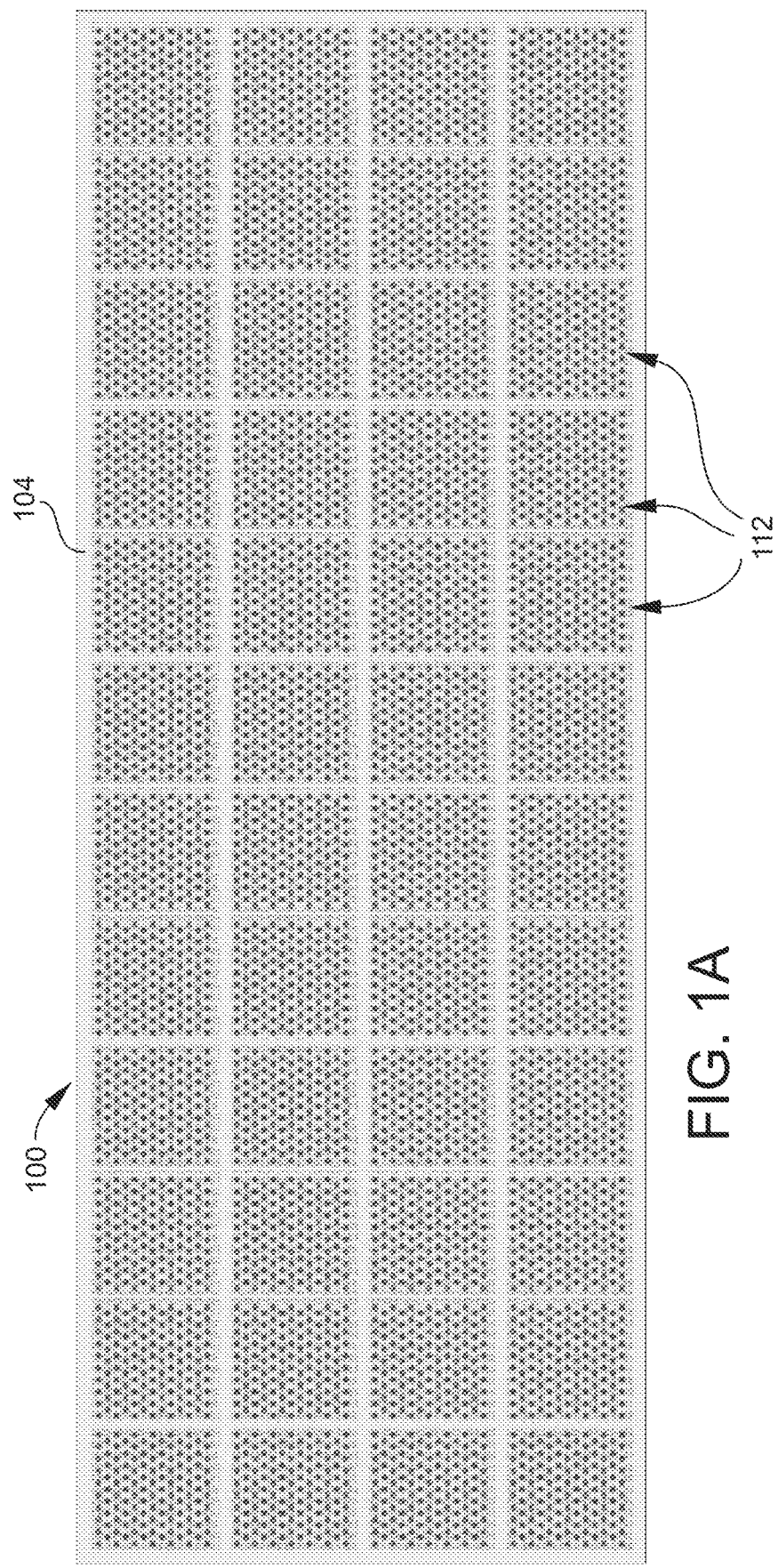

SYSTEMS AND METHODS FOR TRANSFERRING LIQUIDS

RELATED APPLICATIONS

This application claims the benefit of U.S. Provisional Patent Application Ser. No. 62/335,027, filed May 11, 2016, titled "SYSTEMS AND METHODS FOR TRANSFERRING LIQUIDS," the content of which is incorporated by reference herein in its entirety.

TECHNICAL FIELD

The present invention generally relates to transferring liquids from one location to one or more other locations, such as from one surface to another surface or chamber. The liquids, or materials carried by the liquids, may be processed at the location(s) to which they are transferred.

BACKGROUND

Many methods involving the processing of liquids or materials carried by liquids benefit from the use of liquid handling systems configured to enable high-throughput processing and utilize a high degree of automation. Such processing may involve the measurement or assaying of a large number of chemical or biological samples in parallel, or the synthesis of chemical or biological products from a large number of precursor materials. Liquid handling systems have been developed that utilize a motorized pipettor capable of dispensing liquids into and aspirating liquids from the individual wells of multi-well plates loaded onto such systems. Such systems may also utilize a robot to load and unload multi-well plates.

There is an ongoing need, however, to develop systems and methods capable of transferring small quantities of liquids, including liquids carrying materials of interest, from one location to another. There is also an ongoing need to develop systems and methods capable of transferring liquids to and from liquid-supporting devices of different formats, such as flat slides and multi-well plates. There is also an ongoing need to develop systems and methods capable of providing a source of a large number of different liquids or materials, enabling specific liquids or materials to be selected from that source, and thereafter transferring the selected liquids or materials to specific destination sites situated remotely from the source. For certain applications entailing synthesis, it would be desirable to provide a large array of precursor materials at a source location, and then transfer selected precursor materials to a different location for further processing instead of carrying out the synthesis at the same (source) location.

SUMMARY

To address the foregoing needs, in whole or in part, and/or other needs that may have been observed by persons skilled in the art, the present disclosure provides methods, processes, systems, apparatus, instruments, and/or devices, as described by way of example in implementations set forth below.

According to one embodiment, a liquid transfer system includes: a source station configured for supporting a source array, the source array comprising a surface and a plurality of materials arranged on the surface according to a predetermined organization of clusters, wherein each cluster comprises one or more features, each feature comprises one or more of the plurality of materials, and each cluster is spaced from adjacent clusters by an area unoccupied by materials or occupied by inert materials; a destination station configured for supporting a destination site positioned remotely from the source station; a transfer device comprising a transfer element configured for supporting liquid; and a controller configured for: loading liquid to the transfer element; moving the transfer device to a selected cluster of the source array; operating the transfer device to simultaneously transfer the materials located at the features of the selected cluster from the surface to the transfer element, wherein the materials are carried in the liquid supported by the transfer element; moving the transfer device to the destination site; and transferring the materials from the transfer element to the destination site.

According to another embodiment, a method for transferring liquids includes: providing a source array comprising a surface and a plurality of materials arranged on the surface according to a predetermined organization of clusters, wherein each cluster comprises one or more features, each feature comprises one or more of the plurality of materials, and each cluster is spaced from adjacent clusters by an area unoccupied by materials or occupied by inert materials; loading liquid to the transfer element; selecting a cluster of the source array; moving a transfer device to the selected cluster, the transfer device comprising a transfer element configured for supporting liquid; operating the transfer device to simultaneously transfer the materials located at the features of the selected cluster from the surface to the transfer element, wherein the materials are carried in the liquid supported by the transfer element; moving the transfer device to a destination site positioned remotely from the source array; and transferring the materials from the transfer element to the destination site.

According to another embodiment, a method for processing (bio)chemical compounds includes: providing a plurality of (bio)chemical compounds, wherein one or more of the (bio)chemical compounds are different in composition from the other (bio)chemical compounds; creating a source array comprising a plurality of features by positioning a plurality of (bio)chemical compounds on a first support structure, wherein one or more of the (bio)chemical compounds are different in composition from the other (bio)chemical compounds, and the plurality of (bio)chemical compounds is positioned such that: each feature comprises one or more of the (bio)chemical compounds; and the plurality of features is arranged on the first support structure according to a predetermined organization of positions; selecting one or more features; and transferring the (bio)chemical compounds of the one or more selected features to a second support structure, by: moving a transfer element to the one or more selected features; transferring the (bio)chemical compounds of the one or more selected features to the transfer element; moving the transfer element to the second support structure; and transferring the (bio)chemical compounds from the transfer element to the second support structure.

According to another embodiment, a method for processing (bio)chemical compounds includes: providing a plurality of (bio)chemical compounds, the plurality of (bio)chemical compounds comprising different compositional species; creating a source array comprising a plurality of features by positioning a plurality of (bio)chemical compounds on a first support structure, wherein one or more of the (bio)chemical compounds are different in composition from the other (bio)chemical compounds, and the plurality of (bio)chemical compounds is positioned such that: each feature comprises one or more of the (bio)chemical compounds; and the plurality of features is arranged on the first support structure according to a predetermined organization of known positions; selecting one or more features for use in synthesizing one or more (bio)chemical products; contacting the one or more selected features with one or more reagents, under conditions effective for synthesizing the one or more (bio) chemical products from interaction between the (bio)chemical compounds and the one or more regents, wherein the one or more (bio)chemical products are synthesized at one or more respective positions on the first support structure; and transferring the one or more synthesized (bio)chemical products to a second support structure by: moving a transfer element to the one or more positions on the first support structure at which the one or more synthesized (bio)chemical products are located; transferring the one or more synthesized (bio)chemical products to the transfer element; moving the transfer element to the second support structure; and transferring the one or more synthesized (bio)chemical products from the transfer element to the second support structure.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 1A is a schematic top plan view of an example of a source array (or a section thereof) according to an embodiment.

DETAILED DESCRIPTION

Figure 1B:
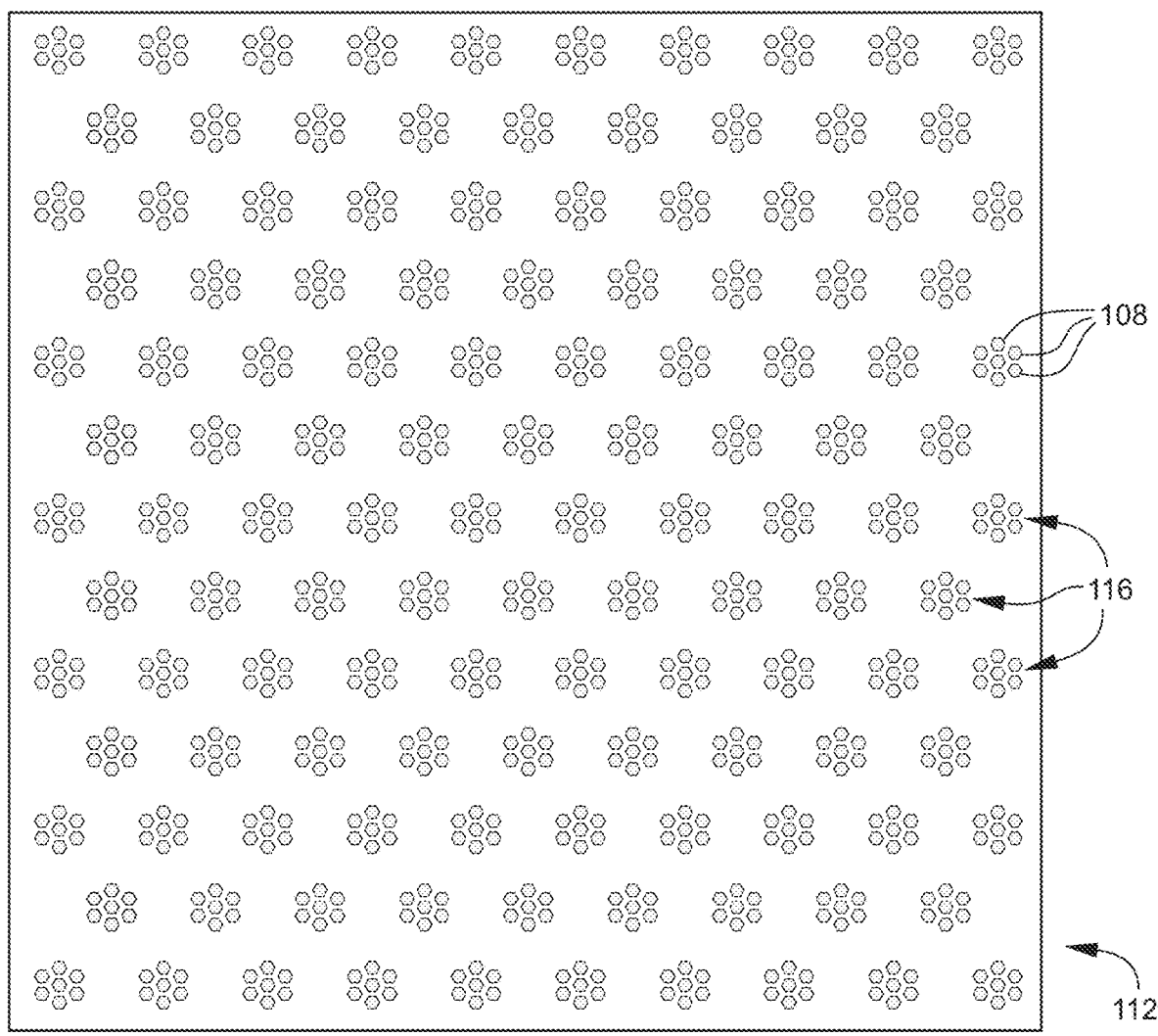
FIG. 1B is a schematic top plan view of a subarray of the source array illustrated in FIG. 1.

As used herein, the term "support structure" refers to a structure having at least one surface capable of retaining materials and/or liquids in a stable (and if desired, ordered) manner. The support structure may be composed of various types of glass, plastic, glass coated with a polymer, polymer coated with a glass, other multiple material/layered configurations, or silicon for this purpose. The surface of the support structure utilized to support a material or liquid may be a flat, planar surface (e.g., an upper or lower surface). For example, the support structure may be provided in the form of a thin plate or a chip (e.g., a "biochip."). One non-limiting example of a support structure is a glass slide. The surface of the support structure may be treated (e.g., functionalized or coated) if desired or needed for a specific purpose such as, for example, enabling attachment or binding (e.g., by adsorption, ionic interaction, covalent bonding, etc.) of materials to the surface, imparting or enhancing the hydrophobicity of the surface, facilitating in situ synthesis of molecules on the surface, etc. In a typical yet non-limiting embodiment, the dimensions of the support structure are on the order of millimeters (mm). As one example, the support structure may have dimensions of 25 mm×76 mm×1 mm. The surface of the support structure is typically rectangular but may have another polygonal shape or a round shape such as a disk shape.

Alternatively, the surface of the support structure utilized to support a material or liquid may be a surface defining a chamber (e.g., a container, receptacle, well, etc.). In some embodiments, a support structure of this type includes a one-dimensional or two-dimensional array of chambers. For example, the support structure may be a multi-well plate, also known as a microtiter plate or microplate.

As used herein, the term "fluid" is used in a general sense to refer to any substance that is flowable through a conduit. Thus, the term "fluid" may generally refer to either a liquid or a gas, unless specified otherwise or the context dictates otherwise.

As used herein, the term "liquid" generally refers to a flowable substance capable of being formed into or existing as a droplet. A liquid may be part of a mixture that also includes a material. In such case, the liquid may be characterized as including or containing the material, or the material may be characterized as being in, or carried in or by, the liquid. The material may be "carried" in the liquid by any mechanism. As examples, the liquid-material mixture may be a solution, a suspension, a colloid, or an emulsion. Solid particles and/or gas bubbles may be present in the liquid. Thus, when a material is "carried in the liquid supported by the transfer element," it is contemplated that in some embodiments the material is itself a solution before contacting the liquid, and is carried in the liquid upon contacting the liquid that is loaded on the transfer element. In some other embodiments, the material may be a dry material and is dissolved by the liquid from the transfer element and thereby carried in the liquid.

As used herein, the term "conduit" generally refers to any type of structure enclosing an interior space that defines a repeatable path for fluid to flow from one point (e.g., an inlet of the conduit) to another point (e.g., an outlet of the conduit). A conduit generally includes one or more walls defining a tube or a channel.

In some embodiments, a conduit may have a small bore. A small-bore tube may be referred to herein as a capillary tube, or capillary. A small-bore channel may be referred to herein as a "microfluidic channel" or "microchannel." The cross-section (or flow area) of a small-bore conduit may have a cross-sectional dimension on the order of micrometers (e.g., up to about 1000 μm, or 1 mm) or lower (e.g., nanometers (nm)). For example, the cross-sectional dimension may range from 100 nm to 1000 μm (1 mm). The term "cross-sectional dimension" refers to a type of dimension that is appropriately descriptive for the shape of the cross-section of the conduit—for example, diameter in the case of a circular cross-section, major axis in the case of an elliptical cross-section, or a maximum width or height between two opposing sides in the case of a polygonal cross-section. Additionally, the cross-section of the conduit may have an irregular shape, either deliberately or as a result of the limitations of fabrication techniques. The cross-sectional dimension of an irregularly shaped cross-section may be taken to be the dimension characteristic of a regularly shaped cross-section that the irregularly shaped cross-section most closely approximates (e.g., diameter of a circle, major axis of an ellipse, width or height of a polygon, etc.). Flow rates through a small-bore conduit may be on the order of microliters per minute (μL/min) or nanoliters per minute (nL/min).

A tube or capillary may be formed by any known technique. The tube or capillary may be formed from a variety of materials such as, for example, fused silica, glasses, polymers, and metals.

A microfluidic channel may be formed in a solid body of material. The material may be of the type utilized in various fields of microfabrication such as microfluidics, microelectronics, micro-electromechanical systems (MEMS), and the like. The composition of the material may be one that is utilized in these fields as a semiconductor, electrical insulator or dielectric, vacuum seal, structural layer, or sacrificial layer. The material may thus be composed of, for example, a metalloid (e.g., silicon or germanium), a metalloid alloy (e.g., silicon-germanium), a carbide such as silicon carbide, an inorganic oxide or ceramic (e.g., silicon oxide, titanium oxide, or aluminum oxide), an inorganic nitride or oxynitride (e.g., silicon nitride or silicon oxynitride), various glasses, or various polymers such as polycarbonates (PC), polydimethylsiloxane (PDMS), etc. The solid body of material may initially be provided in the form of, for example, a substrate, a layer disposed on an underlying substrate, a microfluidic chip, a die singulated from a larger wafer of the material, etc.

The channel may be formed in a solid body of material by any technique, now known or later developed in a field of fabrication, which is suitable for the material's composition and the size and aspect ratio (e.g., length:diameter) of the channel. As non-limiting examples, the channel may be formed by an etching technique such as focused ion beam (FIB) etching, deep reactive ion etching (DRIE), soft lithography, or a micromachining technique such as mechanical drilling, laser drilling or ultrasonic milling. Depending on the length and characteristic dimension of the channel to be formed, the etching or micromachining may be done in a manner analogous to forming a vertical or three-dimensional "via" partially into or entirely through the thickness of the material (e.g., a "through-wafer" or "through-substrate" via). Alternatively, an initially open channel or trench may be formed on the surface of a substrate, which is then bonded to another substrate to complete the channel. The other substrate may present a flat surface, or may also include an initially open channel that is aligned with the open channel of the first substrate as part of the bonding process.

Depending on its composition, the material defining the conduit may be inherently chemically inert relative to the fluid flowing through the conduit. Alternatively, the conduit (or at least the inside surface of the conduit) may be deactivated as part of the fabrication process, such as by applying a suitable coating or surface treatment/functionalization so as to render the conduit chemically inert and/or of low absorptivity to the material. Moreover, the inside surface of the conduit may be treated or functionalized so as to impart or enhance a property such as, for example, hydrophobicity, hydrophilicity, lipophobicity, lipophilicity, low absorptivity, etc., as needed or desirable for a particular application. Alternatively or additionally, the outside of the conduit may also be treated or functionalized similarly. Coatings and surface treatments/functionalizations for all such purposes are readily appreciated by persons skilled in the art.

In some embodiments, the material forming the conduit is optically transparent for a purpose such as performing an optics-based measurement, performing a sample analysis, detecting or identifying a substance flowing through the channel, enabling a user to observe flows and/or internal components, etc.

As used herein, the term "(bio)chemical compound" encompasses chemical compounds and biological compounds. A chemical compound may, for example, be a small molecule or a high molecular-weight molecule (e.g., a polymer). A biological compound may be, for example, a biopolymer.

As used herein, the term "oligonucleotide" denotes a biopolymer of nucleotides that may be, for example, 10 to 300 or greater nucleotides in length. Oligonucleotides may be synthetic or may be made enzymatically. Oligonucleotides may contain ribonucleotide monomers (i.e., may be oligoribonucleotides) and/or deoxyribonucleotide monomers (i.e., may be oligodeoxyribonucleotides). Oligonucleotides may include modified nucleobases. Oligonucleotides may be synthesized as part of or in preparation for methods disclosed herein, or may be pre-synthesized and provided as a starting material for methods disclosed herein. For convenience, oligonucleotides are also referred to herein by the short-hand term "oligos." Oligos utilized to assemble synthons may be referred to herein as "synthon precursor oligos" to distinguish them from other types of oligos that may be utilized or present in the methods and systems, such as the probes of a capture array and adaptor oligos (AOs).

The terms "nucleic acid" and "polynucleotide" are used interchangeably herein to describe a polymer of any length, e.g., greater than about 2 bases, greater than about 10 bases, greater than about 100 bases, greater than about 500 bases, greater than 1000 bases, up to about 10,000 or more bases composed of nucleotides, e.g., deoxyribonucleotides or ribonucleotides, and may be produced enzymatically or synthetically (e.g., PNA as described in U.S. Pat. No. 5,948,902 and the references cited therein) and which can hybridize with naturally occurring nucleic acids in a sequence specific manner analogous to that of two naturally occurring nucleic acids, e.g., can participate in Watson-Crick base pairing interactions. In addition to deoxyribonucleic acid (DNA) and ribonucleic acid (RNA), the terms "nucleic acid" and "polynucleotide" may encompass peptide nucleic acid (PNA), locked nucleic acid (LNA), and unstructured nucleic acid (UNA). Nucleic acids or polynucleotides may be synthesized using methods and systems disclosed herein.

As used herein, the term "gene" refers to a segment (e.g., $10^2$-$10^6$ base pairs (bp)) of DNA that encodes function. Genes may be synthesized using methods and systems disclosed herein.

As used herein, the term "synthon" refers to a synthetic nucleic acid that has been assembled in vitro from several shorter nucleic acids (e.g., oligos) in a defined sequence or order. A synthon may include, for example, a chain assembled from of 3 to 50 oligos. Synthons may be utilized as building blocks to form larger constructs such as, for example, genes. Synthons may be assembled (synthesized) using methods and systems disclosed herein. A synthon so assembled may be of any sequence and, in certain cases, may encode a sequence of amino acids, i.e., may be a coding sequence. In other embodiments, the synthon may be a regulatory sequence such as a promoter or enhancer. In particular cases, the synthon may encode a regulatory RNA. In certain cases a synthon may have a biological or structural function.

As used herein, the term "releasing" in the context of releasing an oligo from the surface of a support structure refers to breaking or overcoming a bond or cleavage site of the oligo such that all or part of the oligo is freed (or unbound, liberated, detached, untethered, de-anchored, etc.) from the surface. Typically, releasing an oligo entails "cleaving" the oligo such as by chemical cleaving, enzymatic cleaving, and photocleaving techniques, as appropriate for the particular embodiment.

The present invention generally relates to transferring (physically transporting) liquids from one or more locations (e.g., a source location or site) to one or more other locations (e.g., a destination location or site), such as from one surface to another surface or chamber. For example, a liquid may be transferred from one glass slide to another glass slide, or from a glass slide to a multi-well plate. In embodiments described herein, liquids are transferred in small amounts and may be in the form of droplets. Transfer elements (examples of which are described below) capable of supporting liquids in small amounts or as droplets may be utilized to transfer the liquids. The liquids to be transferred may be the subject of further processing after being transferred from one location to another. Alternatively, the liquids to be transferred may contain materials of interest for further processing, in which case the liquids may function solely or predominantly as vehicles or media for the transfer of the materials of interest.

The transfer of liquids may be useful in a wide range of applications. One example is transferring one or more liquids from a source location to a destination location so that the liquid(s) may be processed at the destination location. Another example is processing one or more liquids at the source location, and then transferring the processed liquids (or the products of the process) to the destination location for further processing, transport, etc. Examples of processing include, but are not limited to, reacting, diluting, buffering, thermal treatment, incubating, mixing, lysing, cleaving, denaturing, labeling (e.g., with a dye, fluorophore, etc.), distilling, fractionating, filtering, purifying, etc. In some embodiments, reaction may entail or result in synthesis or assembly. For example, one or more (bio)chemical compounds may be transferred from a source location to a chamber, at which the (bio)chemical compounds are contacted with one or more reagents to yield a product. The reagents may be dissolved or suspended in solvents or co-solvents, and added to the chamber before or after the (bio)chemical compounds are transferred to the chamber. In the present context, the term "reagent" encompasses reactants, catalysts, and enzymes. In another example of synthesis, oligonucleotides may be transferred from a source location to a chamber, at which the oligonucleotides are contacted with one or more reagents to assemble a larger nucleotide-based construct (e.g., a synthon).

FIG. 1A is a schematic top plan view of an example of a source array 100 (or a section of a source array 100) according to an embodiment. The source array 100 includes a solid support structure 104 as described above, which in the present embodiment has a flat, planar upper surface. The upper surface has a predetermined pattern of features. Typically, the pattern of features is a one-dimensional (1D, or linear) pattern or as illustrated, a two-dimensional (2D) pattern, with a regular periodicity. Generally, addresses uniquely identify individual spatial positions (e.g., small areas) on the upper surface of the support structure 104, such that each position is exclusively associated with a specific address. Materials such as (bio)chemical compounds may be located, or addressed, at individual positions. Such materials may be utilized to create or define these "features" (or "spots") of the source array 100. That is, the source array 100 includes a plurality of features or spots 108 on the upper surface, as best shown in FIG. 1B. Each feature 108 is located at an individual position on the upper surface and contains one or more materials. Thus, the features 108 may be associated with (may be assigned) unique addresses (feature addresses), and may be arranged or organized as a 1D or 2D array. The plurality of features 108 may be further arranged as a 1D or 2D array of subarrays 112, as illustrated in FIG. 1A. Depending on the type of materials utilized, the features 108 may be created by depositing or synthesizing the materials on the support structure 104.

FIG. 1B is a schematic top plan view of one of the subarrays 112. In some embodiments, the features 108 of the source array 100, and thus in each subarray 112, may be organized into a plurality of clusters 116. Each cluster 116 may include one or more features 108. For example, each cluster may include, independently, 1, 2, 3, 4, 5, 6, 7, 8, 9, 10, 11, 12, 13, 14, 15, 16, 17, 18, or 19 or more features. In some embodiments of the source array 100, all clusters 116 may have at least 2, 3, 4, 5, 6, 7, 8, 9, or 10 features 108. In the illustrated example, the clusters 116 each include seven features 108, while in other examples may include less than or more than seven features 108. The clusters 116 may be arranged in a geometrically close-packed pattern of features 108, such as the illustrated hexagonal pattern. In a multi-feature pattern such as the illustrated hexagonal pattern, each cluster 116 may include a central feature 108 surrounded by one or more rings of additional features 108. Hence, in the illustrated example of seven-feature hexagonal clusters 116, each cluster 116 includes a central feature 108 surrounded by a single ring of six features 108. A cluster 116 may be enlarged by adding more rings of features 108. For example, adding one additional ring to each of the illustrated hexagonal clusters 116 would result in nineteen-feature clusters 116, i.e., the second, outermost ring would contain twelve features 108 in such case. Alternatively, the clusters 116 may be arranged in a concentric circular pattern, with each cluster 116 including a central feature 108 surrounded by one or more circular rings of additional features 108. Other cluster patterns are possible. For example, each cluster 116 may include a rectilinear pattern (one or more rows/columns) of features 108. As shown in FIG. 1B, each cluster 116 is separated (spaced) from adjacent clusters 116 by inert spaces on the surface of the support structure 104, i.e., either spaces unoccupied by materials or occupied by inert materials.

In typical yet non-limiting embodiments, the size of each feature 108 may be on the order of micrometers (μm). As one example, the size of each feature 108 may be in a range from 3.0 μm to 200 μm. In the present context, the "size" of a feature 108 generally refers to the characteristic dimension of the area on the feature 108 spans on the support structure surface. The "characteristic dimension" is the dimension appropriately descriptive of the shape that the feature 108 has or most closely approximates, such as diameter for a circular feature 108 or edge-to-opposing edge length for a polygonal feature 108. In a typical yet non-limiting embodiment, the clusters 116, or at least those clusters 116 occupying the same subarray 112 (or at least those clusters 116 occupying the same row or column in the same subarray 112), are uniformly spaced from each other. The spacing between adjacent clusters 116 in each subarray 112 (or in a common row or column thereof) may range from, for example, 100 to 500 μm. The spacing between adjacent clusters 116 may be set as needed to avoid cross-contamination between adjacent clusters 116.

Depending on the embodiment, the features 108 of a given cluster 116 may include the same materials (materials having the same composition) or different materials (materials having different compositions). Moreover, a single feature 108 may include multiple materials having the same composition or different compositions. In either case, different clusters 116 may include different materials.

In the non-limiting example illustrated in FIGS. 1A and 1B, each subarray 112 contains a total of 143 clusters 116 and thus a total of 1001 features 108. The source array 100 contains a total of 48 subarrays 112 and thus a total of 6864 clusters 116 and 48,048 features 108. It will be appreciated that in other embodiments the source array 100 may contain any number of subarrays 112, clusters 116, and features 108. For example, FIG. 1A may be representative of merely one section of the actual source array 100. A given embodiment of the source array 100 may thus include thousands of subarrays 112, millions of clusters 116, and millions of features 108. As noted above, multiple materials may occupy (and hence be addressed to) a single feature 108. Consequently, thousands to millions of individual materials may be provided by, and organized in a logical, addressable manner in, a single source array 100.

As noted above, each feature 108 may be associated with a unique feature address on the source array 100. Likewise, each cluster 116 may be associated with a unique cluster address on the source array 100. Thus, all materials occupying a given feature 108 may be associated with the address of that particular feature 108 and/or the cluster 116 containing that particular feature 108. Moreover, the identity of the materials located at a given feature 108 may be known (predefined or predetermined) at the time the feature 108 is created on the source array 100. Accordingly, at the time the source array 100 is created, the source array 100 may constitute a fully addressable collection of features 108 each containing a known material or combination of materials. The feature addresses may be defined by any suitable addressing scheme, such as spatial coordinates. The spatial coordinates of a feature 108 may be dimensional values measurable relative to a reference point in a Cartesian frame of reference, for example (x=3500 μm, y=4500 μm), being the distances in the x-direction and y-direction from an origin (x=0, y=0). Alternatively, the spatial coordinates of a feature 108 may be a row number and column number. Alternatively, if the features 108 are grouped into clusters 116, a feature address may include a number assigned to a particular feature 108 in a particular cluster 116, followed by a number assigned to that particular cluster 116 (or by a row number and column number, or other spatial coordinates, assigned to that particular cluster 116). For example, in a seven-feature cluster 116, the features 108 may be addressed as numbers 1 through 7. Feature addresses and cluster addresses may likewise include the address assigned to the subarray 112 of which they are a part, as well as the address (e.g., identification number) of the source array 100 of which they are a part. Thus, for example, a feature address may be expressed in formats such as the following: <source array #> <subarray #> <feature row #> <feature column #>; or <source array #> <subarray #> <cluster #> <feature #>; etc. Feature addresses and cluster addresses may be displayed to and utilized by a user in the form of an alphabetic, numeric, or alphanumeric combination of characters according to any suitable addressing nomenclature. Feature addresses and cluster addresses may be assigned digital values that are stored and utilized by a system controller (e.g., a computing device) for various purposes such as mapping and displaying the collection of features 108, tracking the locations of materials associated with the features 108, controlling the movement of a material transfer device (examples of which are described below) including the end points of travel and the paths taken between end points, etc.

The addressing scheme enables the source array 100 to be organized according to any desired set of criteria. Particularly when the source array 100 contains a collection of a large number of different features 108 (and thus a large number of different materials), the addressing scheme enables the source array 100 to be organized or sorted into smaller, less complex sub-collections, with the sub-collections being defined according to any desired set of criteria. For example, source array 100 may serve as a collection of source materials that may be utilized to synthesize any number of different products. A specific product to be synthesized may be selected. Synthesis of the selected product may require a certain material or combination of materials to be utilized as precursors. For any material or materials selected for use in synthesis (or other process), the addressing scheme enables the location(s) of the material(s) in the source array 100 to be communicated to a transfer device. The transfer device may then be programmed or commanded to move to the address(es) of the selected material(s) and transfer the material(s) from the source array 100 to a destination site at which the synthesis or other process is to be carried out, as described further below.

Figure 2:
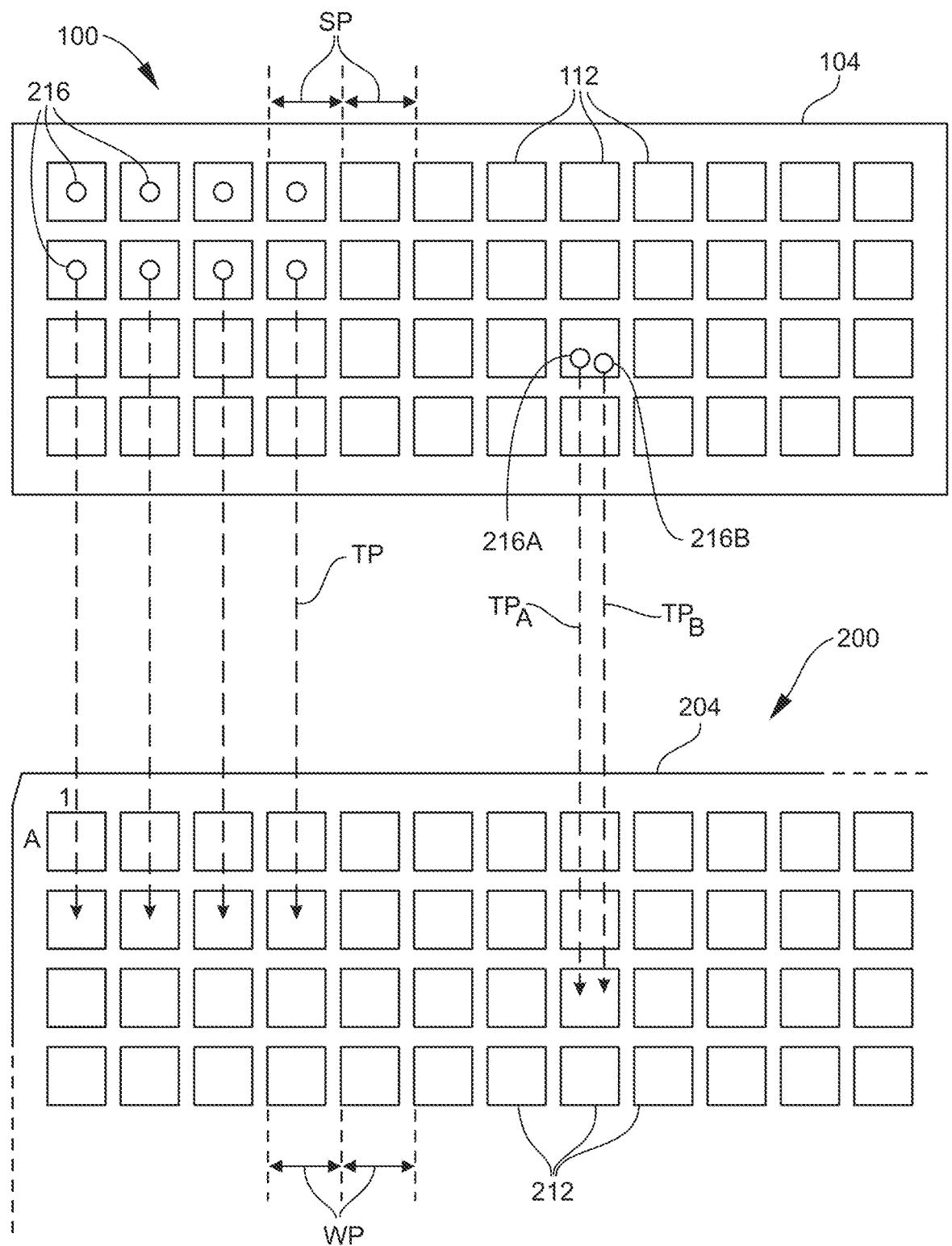
FIG. 2 is a schematic top plan view of an example of a source array (or a section thereof) and a destination or target array (or a section thereof) according to an embodiment.

FIG. 2 is a schematic top plan view of an example of a source array 100 (or a section of a source array 100) and also a destination or target array 200 (or a section of a destination array 200) according to an embodiment. For simplicity, the clusters 116 (FIGS. 1A and 1B) in the subarrays 112 of the source array 100 are not shown in FIG. 2. The destination array 200 includes a support structure 204 and a plurality of destination sites supported by the support structure 204. The plurality of destination sites may be arranged as a 1D or 2D array. In the illustrated embodiment, the destination sites are chambers 212. In a typical yet non-limiting embodiment, the destination array 200 is a multi-well plate in which the chambers 212 (wells) may be integrally formed with the support structure 204 as a monolithic body of material. In other embodiments, the chambers 212 may be individually removable from the support structure 204. For example, the support structure 204 may be a rack or the like and the chambers 212 may be vials or the like that are supported by the rack. In other embodiments, the destination array 200 may be configured more similarly to the source array 100, with the support structure 204 presenting a flat upper surface on which destination sites are defined instead of chambers 212. The source array 100 and the destination array 200 may be utilized as removable components of a liquid transfer system, an example of which is described below. In use, the source array 100 and the destination array 200 are separate components positioned remotely (spaced at a distance) from each other at respective stations addressable by a transfer device of the liquid transfer system.

In the illustrated embodiment, the clusters 116 (FIGS. 1A and 1B) are arranged such that the area or footprint spanned by each subarray 112 on the surface of the support structure 104 is generally rectilinear (e.g., square-shaped). Likewise, the chambers 212 of the destination array 200 are rectilinear. In other embodiments the subarrays 112, or the chambers 212, or both the subarrays 112 and the chambers 212 may be circular or have some other shape. In a typical yet non-limiting embodiment, the format of the destination array 200, including dimensions and the shape of the chambers 212, accords with known standards such as the American National Standards Institute/Society for Laboratory Automation and Screening (ANSI/SLAS) standards for multi-well plates current at the time of filing the present disclosure.

In a typical yet non-limiting embodiment, the subarrays 112 of the source array 100 may be arranged so as to have a substantially uniform pitch. The "pitch" of the subarrays 112 denotes the distance between any two corresponding points of two adjacent subarrays 112, for example, the center-to-center distance (distance from the center of one subarray 112 to the center of an adjacent subarray 112), an edge-to-edge distance (e.g., distance from a point on an edge of one subarray 112 to the corresponding point on the corresponding edge of an adjacent subarray 112), or the like. With the pattern or arrangement of clusters 116 (FIGS. 1A and 1B) also being substantially uniform from one subarray 112 to another subarray 112, the pitch of the subarrays 112 may also (at least substantially or nominally) correspond to the cluster-to-cluster distance between adjacent subarrays 112, i.e., the distance between any two correspondingly positioned clusters 116 of two adjacent subarrays 112. The pitch of the subarrays 112 is referred to herein as the "subarray pitch" SP, an example of which is depicted in FIG. 2.

Similarly, the chambers 212 of the destination array 200 may be arranged so as to have a uniform pitch, as is the case of commercially available multi-well plates. The pitch of the chambers 212 denotes the distance between any two corresponding points of two adjacent chambers 212. The pitch of the chambers 212 is referred to herein as the "chamber pitch" or "well pitch" WP, an example of which is depicted in FIG. 2. In some embodiments, the chamber pitch WP may follow the standard provided by ANSI/SLAS 4-2004 (R2012): Microplates—Well Positions. Thus, the chamber pitch WP may be 9.0 mm for an array of 96 chambers 212, 4.5 mm for an array of 384 chambers 212, or 2.25 mm for an array of 1536 chambers 212. The chamber pitch WP may be considered to be "substantially" equal to 9.0 mm, 4.5 mm, or 2.25 mm when allowing for the positional tolerances specified by ANSI/SLAS 4-2004. In other embodiments, the chamber pitch WP may be less than 2.25 mm, or in a range from 2.25 mm to 9.0 mm, or greater than 9.0 mm. More generally, however, the destination array 200 may include any total number of chambers 212 arranged in any number of rows and columns or any other layout.

In some embodiments, the source array 100 is configured such that its format (or configuration) matches or substantially matches the format of the destination array 200. In the present context, term "format" or "configuration" refers to the subarray pitch SP and the area or footprint spanned by each subarray 112 on the surface of the support structure 104. The area of a subarray 112 may be the area of a circle or polygon that encloses all clusters 116 (FIGS. 1A and 1B) of the subarray 112 in a close-fitting manner, such as the squares shown on the support structure 104 in FIG. 2. Thus, the subarray pitch SP may match (may be equal or substantially equal to) the chamber pitch WP, and the area of each subarray 112 may match (may be equal or substantially equal to) the area of each chamber 212. As described further herein, matching the format of the source array 100 to that of the destination array 300 facilitates the parallel transfer of multiple liquids from respective subarrays 112 to corresponding chambers 212, which may be performed in one or more iterations using an array of transfer elements having a pitch that likewise matches or substantially matches the subarray pitch SP and the chamber pitch WP. Format matching also facilitates the programming of the movement of the transfer device between addresses of the source array 100 and the destination array 200, and the tracking of the positions of specific materials or sets of materials (carried in liquids by the transfer device) before they are transferred and after they have been transferred to selected chambers 212 or other destination sites.

The number of rows and/or columns of subarrays 112 may or may not be equal to the number of rows and/or columns of chambers 212. For many embodiments, the physical footprint of the source array 100 may be significantly smaller than the physical footprint of the destination array 200. In such cases, and further with the subarray pitch SP matching the chamber pitch WP, the number of rows and columns of subarrays 112 may be significantly less than the number of rows and columns of chambers 212. For example, the source array 100 may be a standard-sized glass slide or biochip of typically small dimensions while the destination array 200 may be a standard-sized multi-well plate of comparatively much larger dimensions. At the same time, however, even if the overall footprint and number of rows and columns of the source array 100 are significantly smaller than those of the destination array 200, the number of clusters 116 containing materials may be significantly larger than the number of chambers 212 provided by the destination array 200. Thus, depending on the method being implemented, that method may require the transfer device to make multiple trips between the source array 100 and the destination array 200, and may require the use of multiple destination arrays 200 simultaneously and/or sequentially. Alternatively, depending on the method being implemented, that method may require the transfer device to make multiple trips between the source array 100 and the destination array 200 such that materials from multiple source clusters 116 are transferred to the same chamber 212.

Like the features 108 and clusters 116, each chamber 212 (or other type of destination site of the destination array 200) may be associated with a unique address. The source addresses (or cluster addresses) of the clusters 116 (and/or individual features 108) and the destination addresses (or chamber addresses) of the chambers 212 may be utilized to define the transfer paths along which the transfer device is to move between the source array 100 and the destination array 200, and track the positions of materials. Additionally, the source addresses may be utilized to map the positions of the specific materials or sets of materials on the source array 100 on a cluster-by-cluster basis (or further, on a feature-by-feature basis), and the destination addresses may be utilized to map the positions of the specific materials or sets of materials on the destination array 200 on a destination site-by-site basis (e.g., chamber-by-chamber basis, or spot-by-spot basis).

Figure 3:
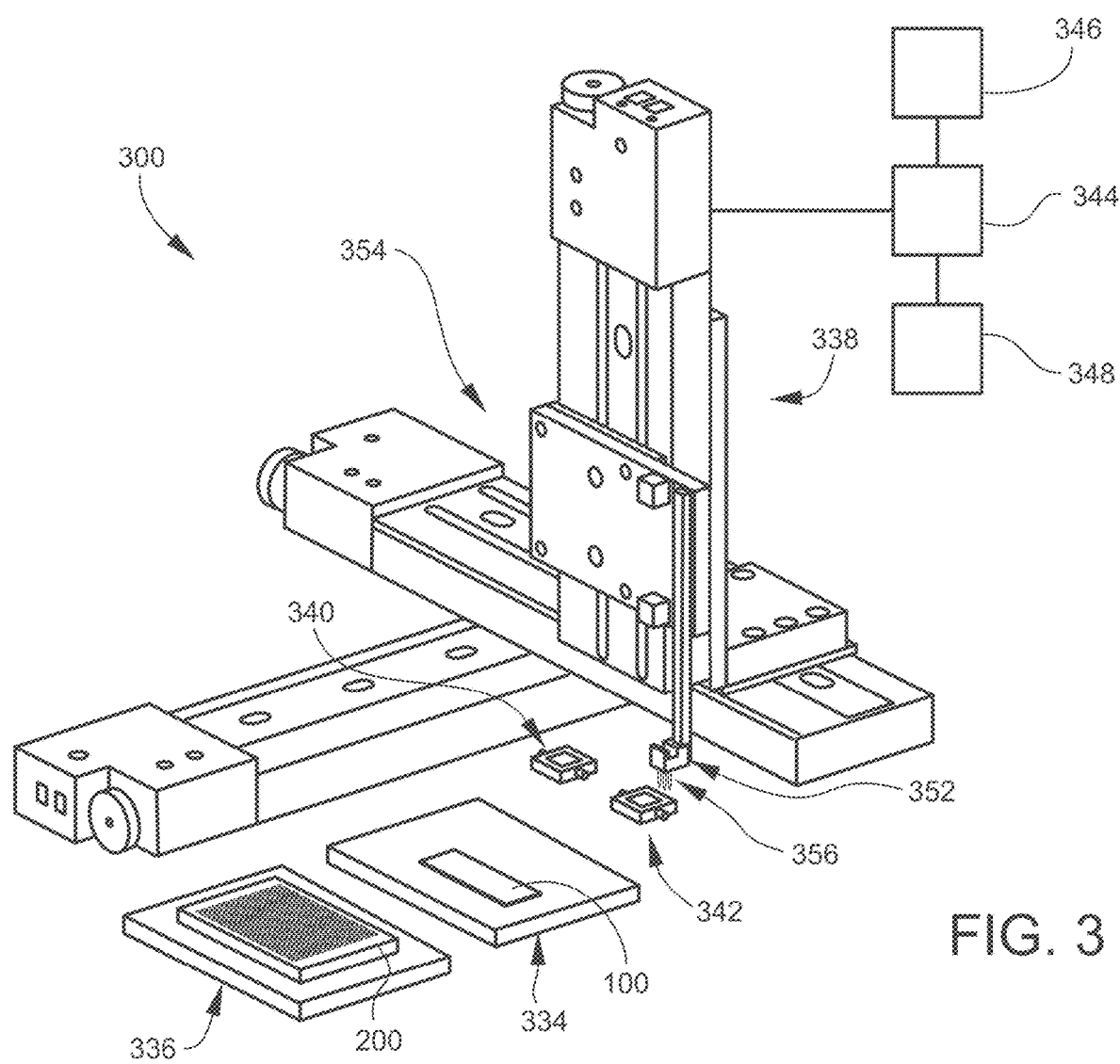
FIG. 3 is a schematic perspective view of an example of a liquid transfer system (or apparatus) according to an embodiment.

FIG. 3 is a schematic perspective view of an example of a liquid transfer system or apparatus (or materials transfer system or apparatus) 300 according to an embodiment. The system 300 may include a variety of stations or modules, devices or components, and (sub)systems serving dedicated functions. In the illustrated embodiment, the system 300 includes a source station 334 configured for supporting one or more source arrays 100; a destination station 336 configured for supporting one or more destination arrays 200; a liquid/materials transfer device 338 configured for transferring liquids (and any materials carried by the liquids) from the source array(s) 100 to the destination array(s) 200; a solution station 340 for holding one or more solutions (e.g., a transfer liquid, such as aqueous buffer); a wash station 342 for holding a wash/rinse solution; a system controller (e.g., computing device) 344 for providing various system control, data processing and storage, and user interface functions; one or more user input devices 346; and one or more user output devices 348. For the purpose of compact illustration in FIG. 3, the foregoing components are shown as being arbitrarily positioned relative to each other. The actual system layout may differ from what is shown in FIG. 3, and may differ from one embodiment to another. In addition, the system 300 may include a housing (not shown) enclosing one or more components and stations of the system 300 to isolate such components and stations from ambient conditions, for example to control humidity in the housing interior and prevent the incursion of dust and particulates into the housing interior. An actively operating humidity control device or system (not shown) may also be provided, particularly to control (e.g., minimize) the evaporation of liquids in the housing interior.

Depending on the embodiment, the system 300 may include other components as needed for proper operation, which are not specifically shown but understood by persons skilled in the art in fields such as, for example, high-throughput liquid handling and sample assaying. Examples of such other components may include, but are not limited to, a reservoir station containing one or more reservoirs (e.g., bottles) for supplying various liquids (e.g., material transfer media, buffer solutions, etc.); a reagent station containing one or more reservoirs for supplying various reagents utilized in reactions; a liquid handling system (e.g., pumps, valves, tubing, capillaries, etc.) for flowing various liquids to various stations such as those noted above or to a waste station, and dispensing (metering) or aspirating liquid in precise volumes as needed at such stations; array storage stations for holding source arrays 100 and/or destination arrays 200; an array handling system, such as may include one or more devices for gripping/manipulating and transporting source arrays 100 and/or destination arrays 200 and thereby enabling automated loading and unloading of source arrays 100 and/or destination arrays 200 at the source station 334 and/or destination station 336 (e.g., a robotic gripper element or other end effector supported by a multi-axis stage, a conveyance device for supporting and moving one or more source arrays 100 and/or destination arrays 200, etc.); positional sensors (e.g., optical encoders, relay switches, etc.) for detecting the positions of source arrays 100 and/or destination arrays 200 and/or their presence at particular positions; liquid sensors for detecting the presence of liquids and/or measuring liquid volumes in chambers 212 (FIG. 2) of the destination array(s) 200 and/or other locations of the system 300; and optical readers for reading barcodes or other indicia that uniquely identify the source arrays 100 and/or destination arrays 300 being utilized.

The source station 334 may include any suitable support or holding structure (e.g., platform, stage, etc.) for securely mounting one or more source arrays 100 in a fixed position during use such that the clusters 116 or features 108 (FIGS. 1A and 1B) may be accurately and repeatably addressable by the transfer device 338. The support may be movable by motorized means or manually. As noted above, means may be provided for loading and unloading source arrays 100 at the source station 334. Likewise, the destination station 336 may include any suitable support or holding structure for mounting one or more destination arrays 200 in a fixed position during use such that the chambers 212 (FIG. 2) are accurately and repeatably addressable by the transfer device 338. As noted above, means may be provided for loading and unloading destination arrays 200 at the destination station 336.

The transfer device 338 may include a transfer element head 352 and an automated three-axis (X-Y-Z) staging device or robot 354 that supports and actuates movement of the transfer element head 352 in three dimensions. Generally, the staging device 354 may have a design similar to automated instruments utilized in fields such as, for example, high-throughput liquid handling and sample assaying. For example, the staging device 354 may be a Cartesian coordinate robot that includes three (X, Y, and Z) motorized linear stages. Each stage may include a carriage coupled to a motor (e.g., a precision, bi-directional stepper motor) via a mechanical linkage (e.g., a screw), whereby the carriage is driven by the motor along a linear guide in either direction along the axis (X, Y, or Z) of that stage. For example, the X-stage may be supported by a fixed base, the Y-stage may be supported by the carriage of the X-stage, and the Z-stage may be supported by the carriage of the Y-stage, thereby enabling horizontal translation of the transfer element head 352 in two dimensions. Further, the transfer element head 352 may be supported by the carriage of the Z-stage to enable vertical translation (lowering and raising) of the transfer element head 352. In some embodiments, the transfer device 338 is configured to provide a positioning accuracy in the X-Y plane that is lower than the dimensions of the individual features 108 (FIG. 1B) of the source array 100. As one non-limiting example, the accuracy may be in a range of 10% to 20% of the feature-to-feature distance.

The transfer element head 352 may include one or more transfer elements 356 mounted thereto. For example, the transfer element head 352 may include a 1D or 2D array of transfer elements 356 mounted thereto. As noted above, in some embodiments the pitch (center-to-center spacing) of the transfer elements 356 may be matched (be equal or substantially equal) to the subarray pitch SP and the chamber pitch WP (FIG. 2). Generally, the transfer elements 356 may have any configuration effective for utilizing small volumes of liquids (e.g., in the range of microliters (µL), nanoliters (nL), or picoliters (pL)) at the respective tips of the transfer elements 456 to extract materials from individual clusters 116 or individual features 108 of a source array 100 and deposit the materials in respective chambers 212 of a destination array 200. Depending on the size of the tips, the transfer elements 356 may be capable of addressing individual clusters 116 (and extract materials from all features 108 of a cluster 116 simultaneously) or individual features 108 of such clusters 116. In some embodiments, the transfer elements 356 and all or part of the transfer element head 352 may be considered to be microfluidic devices in that they may include fluid passages having at least one microscale dimension (e.g., less than 1000 µm) and handle microscale or smaller amounts and flow rates of liquid.

As examples, the transfer elements 356 may be contact transfer elements (involving direct contact with an array surface) or non-contact transfer elements, which are available in various configurations as appreciated by persons skilled in the art. Examples of contact transfer elements include, but are not limited to, solid pins, split pins, microspotting pins ("ink stamps"), tweezers, and capillary tubes. Contact transfer elements may be dipped into the solution provided by the solution station 340, whereby small amounts of the solution are retained on the surfaces of the transfer element tips of solid pins (or retained in the openings of small rings, through which the solid pins are subsequently pushed when depositing the solution), or in internal gaps or channels of the other types of contact transfer elements. To facilitate light-impact, non-damaging, and accurate contact with array surfaces, contact transfer elements may be supported (e.g., by gravity) in the transfer element head 352 so as to be free to translate in the vertical direction (z-axis) in response to making contact with a surface. Examples of non-contact transfer elements include, but are not limited to, capillaries coupled to precision stepper motor-controlled syringes, and ink-jet printing-type dispensers such as capillaries squeezed by piezoelectric-driven elements or nozzles coupled to solenoid valves and syringes. Non-contact transfer elements may not utilize the solution station 340, but instead may be coupled via tubing to one or more liquid (transfer medium) reservoirs positioned remotely from the transfer element head 352.

In an embodiment, the liquid used for the transfer of the material is chosen such that the material, when put into contact with the transfer liquid, will go into solution. Further, if used with a transfer element 356 that transports the liquid/material solution on the outside of a transfer pin, i.e., not within a capillary, the liquid should not appreciably evaporate during the transfer process. To this end, the environmental humidity may be controlled around the whole transfer system 300 and/or the transfer liquid may be selected such that its evaporation is controlled or slowed to an acceptable amount. Further, the transfer liquid should not damage the material, negatively modify the transfer element 356, or interfere with the post-transfer use of the transfer element 356. In an embodiment, the transfer liquid may include one or more additives effective for suppressing evaporation. Examples of additives that may be used with an aqueous solution (i.e., water) include, but are not limited to, glycerol, polyethylene glycol (PEG), dimethyl sulfoxide (DMSO), various salt solutions, sugar alcohols, and other compounds that retard evaporation when added to water.

In an embodiment, prior to the movement of the transfer element head 352 (and thus the transfer elements 356), the physical locations of the various destinations for the transfer element(s) 356 are ascertained/calibrated, most especially the exact positions of the clusters 116 (FIG. 1B) on the source array 100. While the locations of the transfer liquid station 340, wash station 342, and drying station should be determined as well, the accuracy of the location/position of the clusters 116 should be very well calibrated. For example, for a cluster 116 that is made up of 7 or 19 features 108, each of which may be approximately 65 µm center-to-center from each other, the position of the center of each cluster 116 (or the center of the central feature 108 of each cluster 116) should be known and the motion of the transfer element(s) 356 calibrated such that the transfer element(s) 356 can be repeatedly and reliably moved to specifically addressed clusters 116 with better than, e.g., 5 to 10 µm accuracy.

Figure 9:
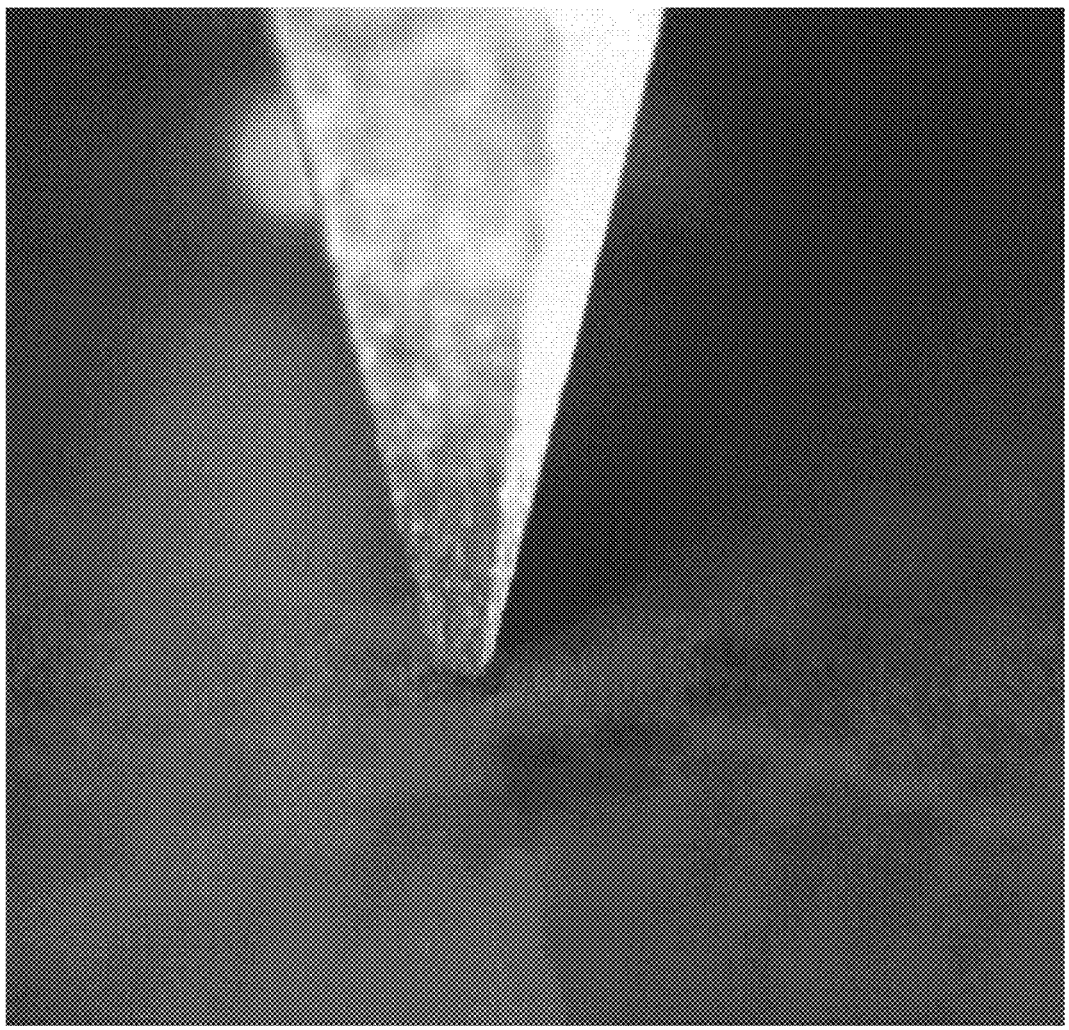
FIG. 9 is a photograph of a solid-tipped transfer element located over a cluster of a source array, illustrating a method for utilizing a humid gas to locate features of an array according to an embodiment.

In some embodiments such as when the source array 100 is, for example, an array of oligonucleotides on a glass slide, the individual features 108 may have a hydrophobicity that is different from the background area surrounding each feature 108. This may enable a method to visualize the features 108 and thereby the clusters 116 of features 108 by using a humid gas stream blown over the array such that there is a differential condensation rate between the features 108 and their background. The difference in condensation rate may clearly delineate the locations of the features 108 and thereby the clusters 116, enabling visualization of the array features 108 and the calibration of the transfer system 300 to the array features 108. As an example, FIG. 9 is a photograph of a solid-tipped transfer element located over a cluster of a source array. Humid gas was blown onto the source array resulting in moisture condensing on the features faster than on the surfaces between the features, allowing accurate alignment of the transfer element(s) to the source array. This only needs be performed when a new source array is introduced to the transfer system 300. If appropriate, this moisture-assisted method for visualizing locations of materials may also be performed on a destination array 200.

The motion of the transfer element head 352 (and thus the transfer elements 356) may be controlled by the system controller 344 in accordance with user input enabled by the user input devices 346 or a pre-programmed itinerary as may be dictated by a software program (e.g., a set of instructions executed by the system controller 344). The transfer elements 356 may be moved according to precise, predefined velocity profiles, and along predefined transfer paths between the source array(s) 100 and the destination array(s) 200 respectively loaded in operative positions at the source station 334 and the destination station 336. At the source station 334, the transfer elements 356 may be lowered toward a source array 100 such that the tips of the transfer elements 356, or liquids present at the tips of the transfer elements 356, contact the material or materials occupying the targeted clusters 116 (or specific targeted features 108 of the clusters 116) respectively aligned with the transfer elements 356, whereby the material or materials are drawn into the respective liquid volumes.

The transfer elements 356 may then be moved to the destination station 336. At the destination station 336, the transfer elements 356 may be lowered toward a destination array 200 so as to deposit the material or materials borne on the transfer element tips into targeted chambers 212 or destination sites of the destination array 200.

After the selected material or materials have been transferred to a selected chamber 212, the material or materials may be processed at the chamber 212 as prescribed by the particular method being implemented. A given process may require the material(s) to be contacted (e.g., mixed, interacted) with one or more liquids, which may be or carry reagents. Such liquids may be added to the chamber 212 before or after the material(s) have been transferred to the chamber 212. In some embodiments, such liquids may be added by operating liquid handling components of the system 300.

As described elsewhere herein, in some embodiments the tip of a transfer element 356 may be sized so as to be capable of addressing an individual cluster 116 and extracting materials from all or some of the features 108 of the cluster 116 simultaneously. The transfer element 356 may then transfer all of the materials carried by that transfer element 356 simultaneously into a single targeted chamber 212. The ability to simultaneously transfer materials from multiple features 108 of the same cluster 116 is useful, for example, in an embodiment where the cluster 116 contains a combination of different materials utilized in carrying out a particular reaction or assembly/synthesis process. In such case, a particular combination of different materials needed to carry out a desired reaction or assembly/synthesis process may be selected simply by selecting a cluster 116 of the source array 100 containing the particular combination, and the transfer element 356 is required to make only a single trip from the source array 100 to the destination array 200.

To prevent material or liquid carryover from a preceding transfer process, between each transfer process iteration the transfer element head 352 may be moved to the wash station 342 at which the transfer elements 356 may be dipped into a wash/rinse solution. The wash/rinse process may be assisted by vacuum and/or liquid or gas jets. After washing/rinsing, the transfer element head 352 may be returned to the source array 100 (or moved to a different source array 100) to extract additional materials.

The system controller (e.g., computing device) 344 may schematically represent one or more modules (or units, or components) configured for controlling, monitoring and/or timing various functional aspects of the system 300 such as, for example, tracking the locations of specific materials or sets of materials, tracking and controlling the movement of the transfer element head 352 at and between the various stations, controlling liquid handling operations, controlling materials processing operations carried out at the source array 100 and/or destination array 200, etc. One or more modules may be, or be embodied in, for example, a computer workstation or desktop computer, or a mobile computing device such as a laptop computer, portable computer, tablet computer, handheld computer, personal digital assistant (PDA), smartphone, etc. The system controller 344 may also be configured for providing and controlling a user interface that provides screen displays of objects or data with which a user may interact, such as maps of source arrays 100 and destination arrays 200, fields for inputting data and control parameters of the system 300, etc. The system controller 344 may include one or more reading devices on or in which a non-transitory (tangible) computer-readable (machine-readable) medium may be loaded that includes instructions for performing all or part of any of the methods disclosed herein. For all such purposes, the system controller 344 may be in signal communication with the drivers of the transfer device 338 and various sensors and other components of the system 300 via wired or wireless communication links (as partially represented in FIG. 3 by a line between the system controller 344 and the transfer device 338). Also for these purposes, the system controller 344 may include one or more types of hardware, firmware and/or software, as well as one or more memories and databases. Examples of user input devices 346 include, but are not limited to, a keyboard, keypad, touch screen, mouse, joystick, trackball, light pen, other pointing devices, microphone, etc. Examples of user output devices 348 include, but are not limited to, a display screen, printer, visual indicators such as lamps or light-emitting diodes LEDs), audible indicators such as loudspeakers, etc.

FIG. 2 illustrates a few examples of operating the transfer device 338 to transfer selected materials from a source array 100 to a destination array 200 in a controlled manner. For any given iteration of travel between the source array 100 and the destination array 200, the movement of the transfer element head 352 in the X-Y plane may be defined (e.g., determined, calculated, etc.) based on the addresses of the selected clusters 216 (or individual features 108) and the addresses of the chambers 212 selected to receive the respective materials from the selected clusters 216. The chambers 212 (and the destination array 200, if more than one is available) may be selected by user input, or automatically by the system controller 344 based on one or more factors such as the location of available destination arrays 200; the relative locations of the source array 100 and an available destination array 200; the format (number of row and columns, row/column ratio, and pitch) of the transfer elements 356; the availability of specific chambers 212 of the destination array 200 to receive materials; etc.

In the example illustrated in FIG. 2, a 2×4 array of transfer elements 356 is mounted at the transfer element head 352, hence enabling a similarly pitched 2×4 array of clusters 216 containing respective materials (or sets of materials) to be selected. Alternatively, the transfer elements 356 may be sized such that a 2×4 array of specific features (located in respective clusters 216) containing respective materials may be selected. In the example specifically illustrated, clusters 216 occupying the upper leftmost group of subarrays 112 have been selected, and the upper leftmost group of chambers 212 have been selected as the destination of the selected materials. More generally, any group of subarrays 112 of the source array 100 and any group of chambers 212 of the destination array 200 may be selected. As the addresses of the selected clusters 216 (and/or features 108 thereof) and chambers 212 are known, the parameters of the movement of the transfer element head 352 (e.g., path, velocity profile, etc.) may be defined and the transfer device 338 may be programmed or commanded accordingly. The transfer element head 352 may then be driven along the horizontal X-Y plane to move to a position over the source array 100 at which the transfer elements 356 are respectively aligned with the selected clusters 216. The transfer element head 352 may then be lowered along the vertical Z-axis to enable the selected materials to be transferred to the respective transfer element tips.

After the selected materials have been transferred to the respective transfer element tips, the transfer element head 352 may then be raised along the vertical Z-axis and driven to move along the X-Y plane to a position over the destination array 200 at which the transfer elements 356 are respectively aligned with the selected chambers 212. FIG. 2 illustrates parallel transfer paths TP (depicted by dashed arrows) simultaneously taken by the transfer elements 356 (and thus the liquids/materials carried by the transfer elements 356) from the source array 100 to the destination array 200. In the present example of a 2×4 array of transfer elements 356, there are a total of eight transfer paths TP, only four of which are shown for ease of illustration. At the selected chambers 212, the transfer element head 352 may then be lowered along the Z-axis to enable the selected materials to be transferred to the respective chambers 212.

Depending on the method being carried out, the liquid/material transfer process described above may be repeated as many times as needed to transfer additional liquids/materials to the same group of chambers 212 or to additional groups of chambers 212. The row/column ratio of the array of transfer elements 356 mounted to the transfer element head 352 may be proportionally matched to the row/column ratio of the subarrays 112 of the source array 100 (and to the row/column ratio of the chambers 212 of the destination array 200) to facilitate the simultaneous use of multiple transfer elements 356 and the ability to address each subarray 112 and/or chamber 212 at least once during the same method if desired. For example, if a source array 100 has 1536 subarrays 112 arranged in thirty-two rows and forty-eight columns (thus having a row/column ratio of 2:3), a transfer element array with four rows and six columns (thus also having a 2:3 row/column ratio) may be utilized by having the transfer element head 352 make eight trips to the source array 100 in order to address each subarray 112 once. The collection of materials may be carefully constructed on and mapped to the source array 100 to facilitate the use of a multi-transfer element array. Additionally, the system controller 344 may execute a materials tracking module and a transfer device control module in a coordinated manner.

FIG. 2 illustrates a further example in which a method calls for the transfer element head 352 to make multiple trips between the source array 100 and the destination array 200. In this example, the materials occupying two different clusters 216A and 216B of the same subarray 112 are to be moved to the destination array 200. The transfer element head 352 may first move to the source array 100 so as to align a transfer element 356 with the first cluster 216A, and then move along a transfer path $TP_A$ to transfer the material from the first cluster 216A to a selected chamber 212. The transfer element head 352 may then return to the source array 100 so as to align a transfer element 356 with the second cluster 216B, and then move along a potentially different transfer path $TP_B$ to transfer the material from the second cluster 216B to a selected chamber 212. In the illustrated example, materials from both clusters 216A and 216B are transferred to the same chamber 212, but may instead be transferred to different chambers 212. Moreover, when a multi-transfer element array is utilized as described above, it will be understood that the first cluster 216A may be part of an array of clusters transferred simultaneously during a first iteration of travel from the source array 100 to the destination array 200, and the second cluster 216B be part of different array of clusters transferred simultaneously during a second iteration of travel from the source array 100 to the destination array 200.

Depending on the number of materials or sets of materials to be transferred, additional destination arrays 200 may be needed. Two or more destination arrays 200 may be loaded adjacent to the each other at the destination station 336 (FIG. 3) if sufficient space is provided for this purpose. The respective identities of the destination arrays 200 and their respective positions at the destination station 336 may be part of the addresses assigned to the chambers 212. Additionally or alternatively, any given destination array 200 at the destination station 336 may be replaced by another destination array 200 either manually or by automated means as noted above. Likewise, additional source arrays 100 may be utilized. Two or more source arrays 100 may be loaded adjacent to the each other at the source station 334, and/or any source array 100 may be replaced by another source array 100 at the source station 334.

In other embodiments, a single transfer element 356 may be mounted to the transfer element head 352. As the transfer element head 352 can move the transfer element 356 from any cluster of the source array 100 to any chamber 212 of the destination array 300, use of a single transfer element 356 may be desirable for imparting greater flexibility to method development, although at the expense of lower processing throughput and increased consumption of time.

An alternative embodiment to the transfer element head 352 being the sole moving component in the system may be implemented. The most stringent alignment and accuracy needed for the transfer system is between the transfer elements 356 and the features 108 and clusters 116 of the source array 100. The high accuracy is not needed for movement of the transfer elements 356 to the other locations (destination array 200, solution station 340, wash station 342, etc.) unless the destination array 200 requires high accuracy. For example, if the destination array 200 is a well plate, the required accuracy may be as large as 0.5 millimeters. This provides the opportunity to configure the system as follows: place the source array 100 on a short travel, very accurate X-Y stage system; place the transfer elements 356 on a Z-travel stage mounted on a fixed base; and place all other low-accuracy-requirement stations, including the destination array 200, on a large travel X-Y stage. In one example of operating a transfer system with this configuration, the transfer element head 352 is only moved up and down to and away from the source array 100 below it. The source array is moved short distances to accurately align its features 108 and clusters 116 to the transfer elements 356. The low-accuracy stations are placed on a plane that is between the plane of the source array 100 and the maximum Z-travel height of the transfer elements 356. When it is necessary for the transfer elements 356 to be placed at the destination array 200 or one of the low accuracy stations, the large-travel X-Y stage is activated such that they are placed as needed below the transfer elements 356. In this manner, the low accuracy stations and destination array 200 are brought to the transfer elements 356 rather than vice versa as in previously described embodiments. This has an advantage of using a small high accuracy stage rather than a large high accuracy stage.

Figure 4:
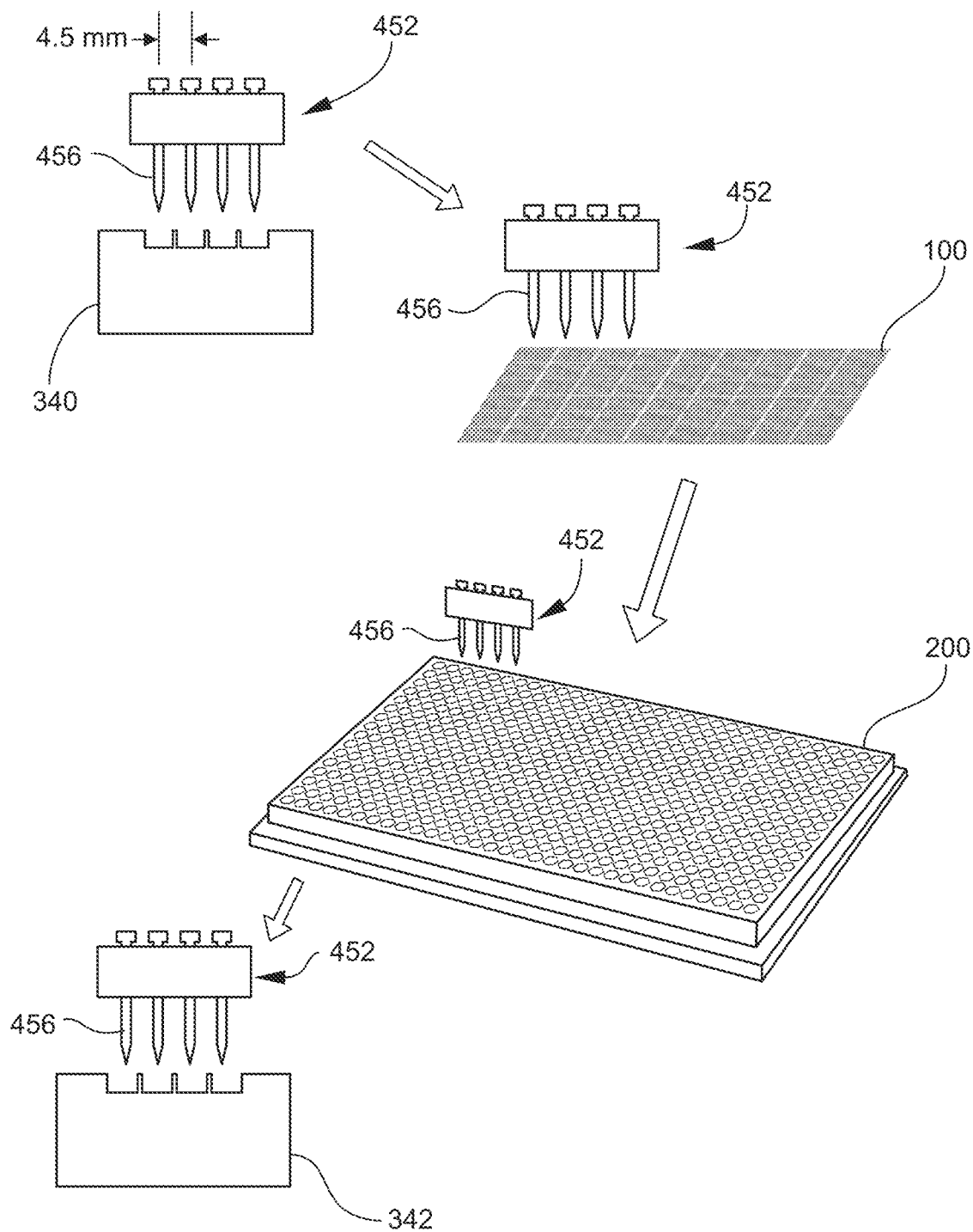
FIG. 4 is a schematic diagram illustrating an example of a liquid transfer process according to an embodiment that utilizes an array of pins or other type of contact transfer element mounted to a transfer element head.

FIG. 4 is a schematic diagram illustrating an example of a liquid/material transfer process according to an embodiment that utilizes an array of pins 456 or other type of contact transfer element mounted to a transfer element head 452. The pins 456 are moved to the solution station 340 and dipped into the solution provided thereby, whereby a volume of solution (i.e., droplet) is retained on the tip of each pin 456. Generally, the solution may be any liquid suitable for serving as a transfer medium for the materials being transferred, one non-limiting example being an aqueous solvent. The pins 456 are then moved to a source array 100 and lowered such that the solution droplets on the pin tips contact respective clusters 116 (or features 108 thereof, FIGS. 1A and 1B)), whereby the materials occupying the clusters 116 (or features 108 thereof) are drawn into the respective solution droplets. The pins 456 are then moved to a destination array 200 and lowered into respective chambers 212 (or onto another type of destination site) containing a solution, whereby the materials carried by the solution droplets on the pin tips are transferred into the solution contained in the respective chambers 212. The materials so transferred may then be processed in the chambers 212 in accordance with the particular method being implemented. The transfer element head 452 may thereafter be moved to the wash station 342 at which the transfer elements 356 may be immersed into a wash/rinse solution as described above.

Figure 5:
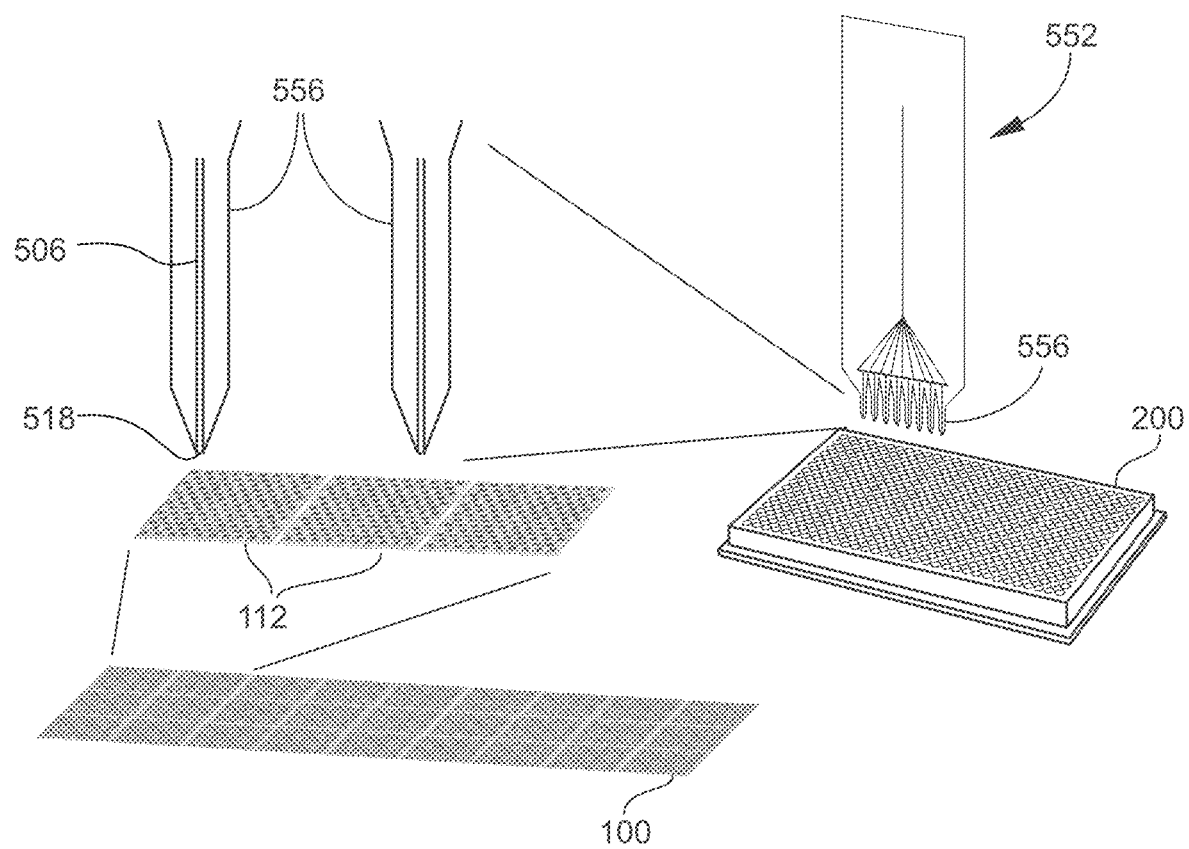
FIG. 5 is a schematic diagram illustrating an example of a liquid transfer process according to an embodiment that utilizes an array of capillaries or other type of non-contact transfer element mounted to a transfer element head.

FIG. 5 is a schematic diagram illustrating an example of a liquid/material transfer process according to an embodiment that utilizes an array of capillaries 556 or other type of non-contact transfer element mounted to a transfer element head 552. Each capillary includes tip opening 518 and an internal conduit 506 communicating with the tip opening 518. The capillaries 556 are fluidly coupled to a liquid handling system that supplies solution to the capillaries 556 from one or more reservoirs external to the capillaries 556.

Thus, the solution station 340 (FIGS. 4 and 5) may not be needed. Other types of non-contact transfer elements may utilize the solution station 340 and draw buffer solution into internal reservoirs, channels, or gaps of the non-contact transfer elements. The capillaries 556 are moved to a source array 100 and lowered toward selected clusters 116 (or features 108 thereof). A small aliquot or droplet of solution is extruded from the tip of each capillary 556 so as to contact the target materials occupying the clusters 116 (or features 108 thereof), whereby the materials are drawn into the respective aliquots. The aliquots now carrying the materials are then aspirated back into the capillaries 556 and the capillaries 556 are moved to the destination array 200. The capillaries 556 are then lowered into respective chambers 212, and the materials carried by the aliquots in the capillaries 556 are then dispensed into the respective chambers 212. The capillaries 556 may thereafter be subjected to a wash/rinse process.

Although the capillaries 556 may be configured to pick up materials without the capillary tips physically contacting the materials or support, in other embodiments the capillaries 556 may be configured to allow the capillary tips to contact the materials or support. The use of capillaries 556 that contact the materials may relax the degree of accuracy required in positioning of the capillaries 556 relative to the target materials on the source array 100. As another example, the capillaries 556 depicted in FIG. 5 may be schematically representative of pins, with each pin including an internal conduit 506 communicating with a tip opening 518. By this configuration, the pin may be utilized to draw liquid through the tip opening 518 into the internal conduit 506.

For simplicity, FIG. 4 illustrates a single row of pins 456 and FIG. 5 illustrates a single row of capillaries 556. It will be understood, however, that a 2D array of pins 456 or capillaries 556 may be provided as described above.

Figures 6A, 6B:
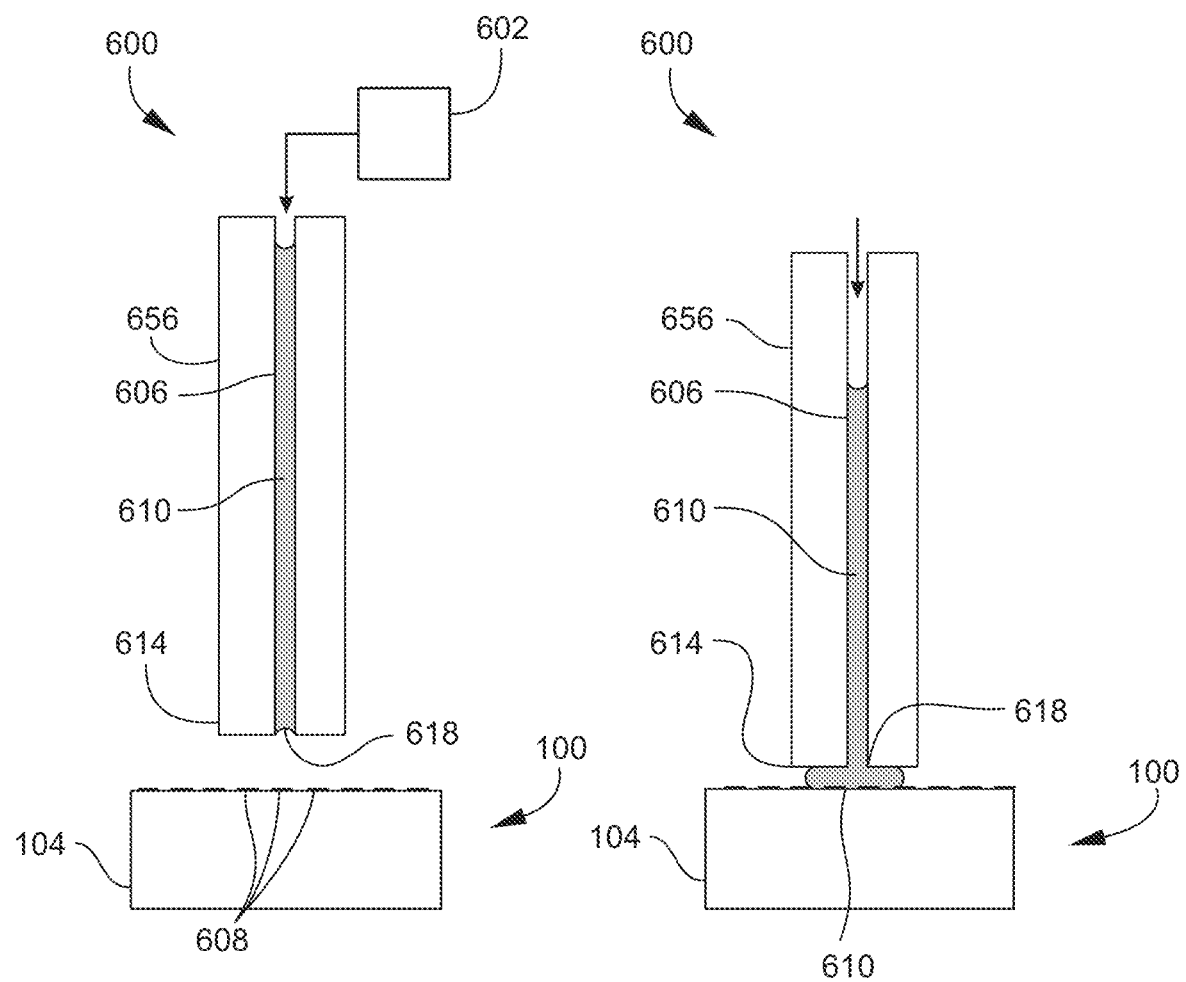
FIGS. 6A-6E are cross-sectional schematic views of an example of an active capillary device or system according to an embodiment, illustrating a sequence of steps of an example of transferring material from a source array to a destination array according to an embodiment.

FIGS. 6A-6E are cross-sectional schematic views of an example of an active capillary device or system 600 according to an embodiment. Referring to FIG. 6A, the active capillary device 600 includes a transfer element in the form of a capillary 656, which communicates with a fluid-based control system in the form of a controllable pressure source 602, as indicated by an arrow. The capillary 656 includes a body of material through which an internal capillary channel 606 extends. The capillary channel 606 is configured to accommodate a small volume of transfer liquid 610. The capillary 656 terminates at a capillary tip 614. The capillary channel 606 extends through the capillary 656 to a capillary channel opening 618. The body or wall(s) defining the capillary channel 606 are hydrophilic such that transfer liquid 610 is drawn up and into the capillary channel 606 when the capillary tip 614 is introduced to a source of the transfer liquid 610. The hydrophilicity may be an inherent property of the capillary material, or may be the result of a suitable coating or surface treatment, as appreciated by persons skilled in the art. In an embodiment, the face of the capillary tip 614 may be hydrophobic (inherently or via a coating or treatment), thereby inducing all liquid to interact preferentially with the capillary channel 606 only.

The upstream controllable pressure source 602 may schematically represent a source of a suitably inert gas (e.g., air, helium, nitrogen, argon, etc.), a valve or other type of flow controller, a conduit communicating with the end of the capillary channel 606 opposite to the capillary tip 614, etc. The controllable pressure source 602 is configured to provide positive pressure (relative to, e.g., ambient air pressure) to the capillary channel 606 on command. The controllable pressure source 602 is utilized to extrude the transfer liquid 610 from the capillary 656. The controllable pressure source 602 may also be utilized to extrude a liquid utilized for cleaning and rinsing the capillary channel 606.

Figure 6C:
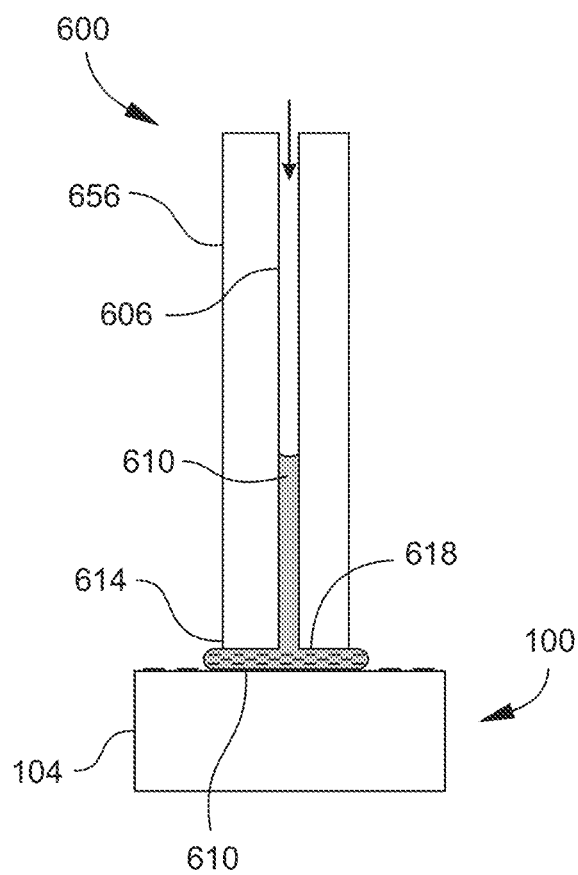
Figure 6D:
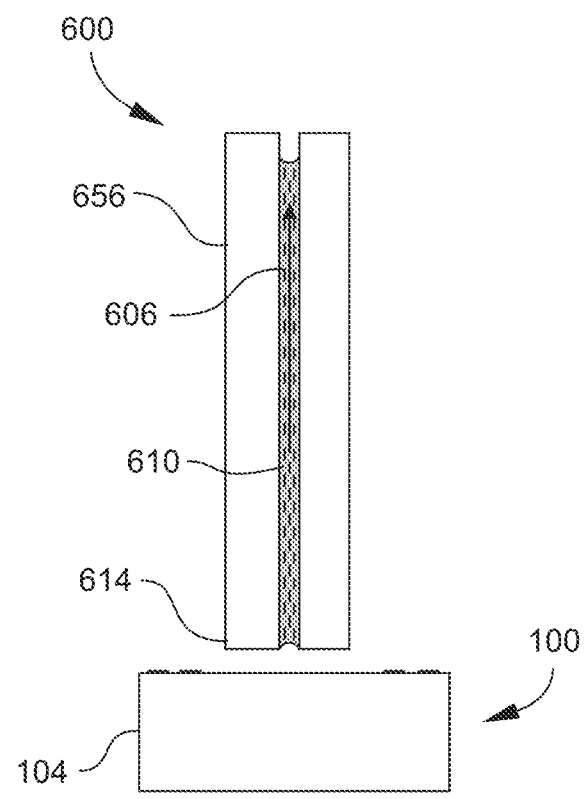

FIGS. 6A-6E illustrate a sequence of steps of an example of a method for transferring material 608 from a source array 100 (FIGS. 6A-6D) to a destination array 200 (FIG. 6E) according to an embodiment. Referring to FIG. 6A, the capillary 656 is loaded with transfer liquid 610. Specifically, the capillary 656 is moved to a reservoir (e.g., transfer liquid station 340, FIG. 3) such that transfer liquid 610 is drawn into the capillary channel 606 through capillary action (e.g., wicking). The capillary 656 is then moved to the source array 100 and aligned directly above a selected cluster containing materials (features) 608. Referring to FIGS. 6B and 6C, the capillary tip 614 is then lowered to a short, non-zero distance (e.g., 0 to 100 μm or more) from the surface of the source array 100. The controllable pressure source 602 (FIG. 6A) is then activated to extrude a small quantity of the transfer liquid 610 from the capillary channel 606 through the capillary tip 614. Consequently, material 608 enters into solution within the transfer fluid 610. Referring to FIG. 6D, the controllable pressure source 602 is then operated (e.g., deactivated) to release the gas pressure such that the transfer liquid 610, now containing the material 608, is drawn again into the capillary channel 606. An extension to this embodiment comprises loading additional materials into the transfer fluid in the capillary 656 from additional clusters, using the process above, before proceeding further. In this manner, the materials from multiple clusters are transferred to a single destination address using only a single transfer action.

Figure 6E:
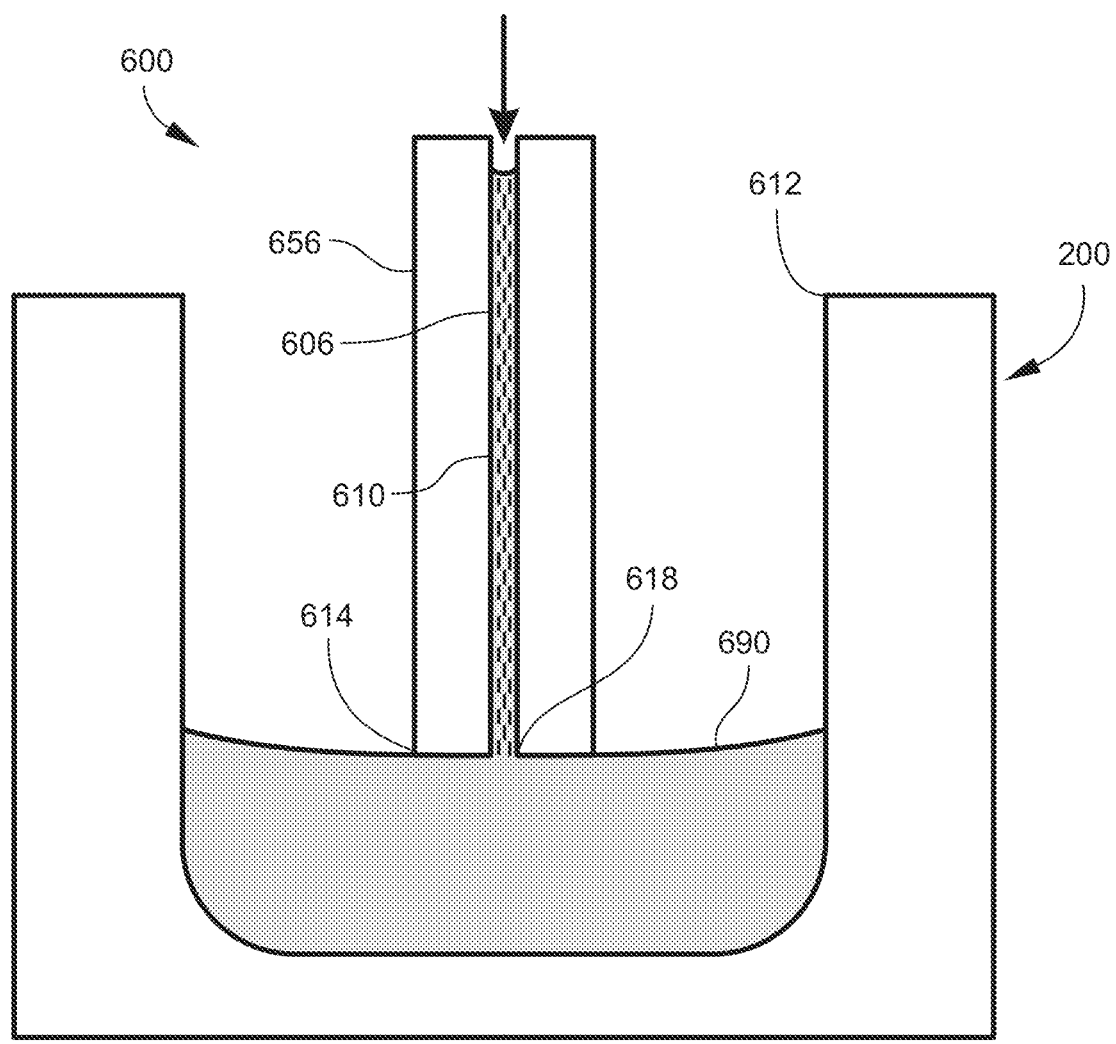

Referring to FIG. 6E, the capillary 656 is then moved to the destination array 200 and lowered to the destination address. In the present example, FIG. 6E shows a single capillary 656 having been moved to a single well 612 of the destination array 200 (e.g., a multi-well plate). The controllable pressure source 602 (FIG. 6A) is again activated such that the transfer liquid 610 containing the material 608 is extruded into the well 612. The extrusion of the transfer liquid 610 optionally may be made into a receiving liquid 690 that was previously dispensed into the well 612. In some embodiments, the receiving liquid 690 may be a solution containing one or more reagents effective for carrying out a desired reaction or synthesis entailing the use of the materials 608 transferred by the capillary 656. The capillary 656 may thereafter be removed from the destination array 200 and, optionally, moved to a cleaning station (e.g., wash station 342, FIG. 3) at which the capillary channel 606, the capillary tip 614, and other portions of the capillary 656 may be cleaned to remove any remaining material 608.

It will be understood that, as in other embodiments disclosed herein, multiple capillaries 656 may be provided as an array of transfer elements carried by a single transfer element head (e.g., the transfer element head 352 described above and illustrated in FIG. 3), thereby enabling parallel processing of multiple clusters of materials 608.

Figures 7A, 7B:
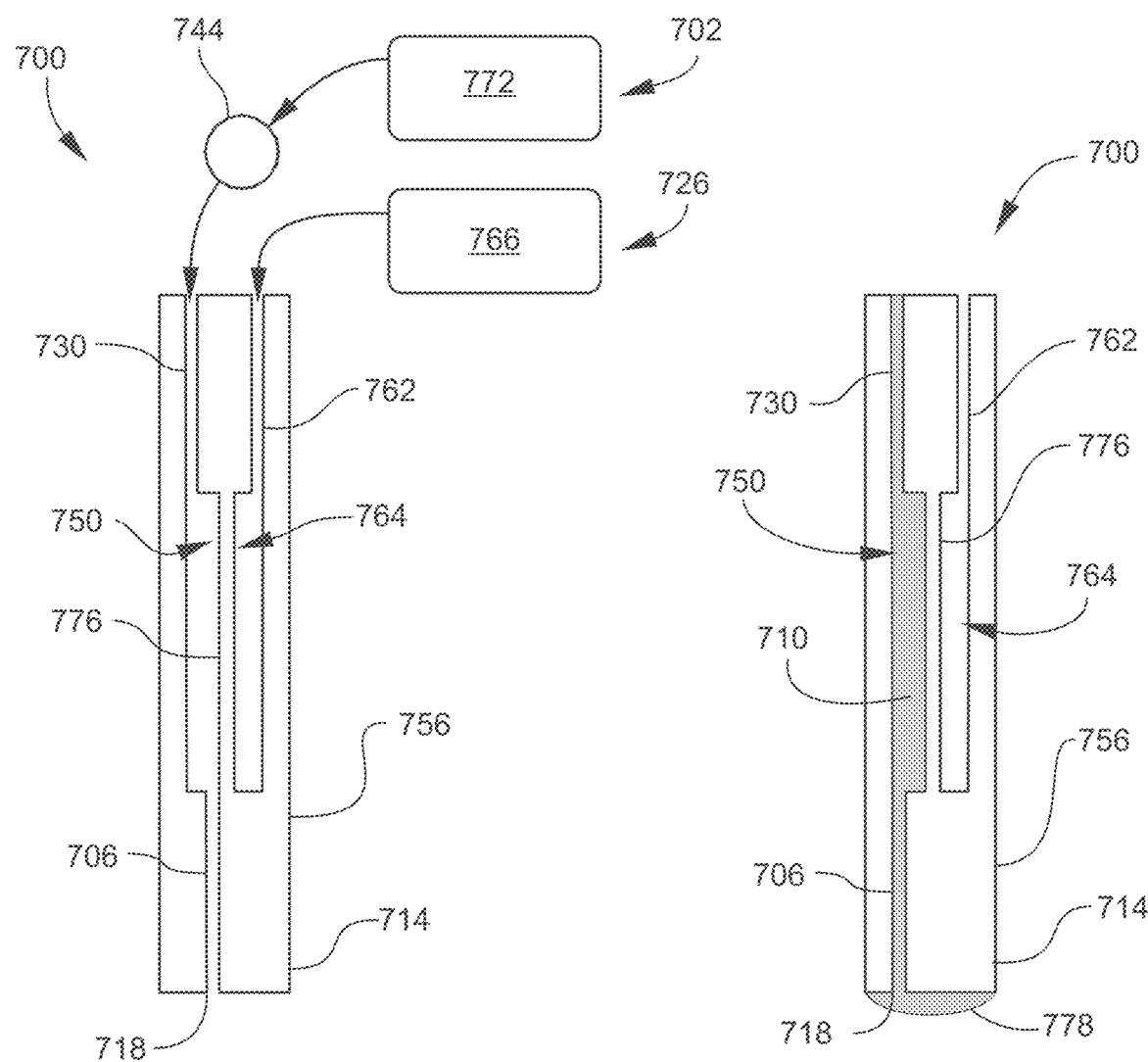
FIGS. 7A-7G are cross-sectional schematic views of an example of a metered active capillary device or system according to an embodiment, illustrating a sequence of steps of an example of transferring material from a source array to a destination array according to an embodiment.

FIGS. 7A-7G are cross-sectional schematic views of an example of a metered active capillary device or system 700 according to an embodiment. Referring to FIG. 7A, the metered active capillary device 700 includes a transfer element formed by or part of a fluidic chip 756. The fluidic chip 756 includes a body of material that terminates at a capillary tip 714. The fluidic chip 756 is part of a fluid-based control system that includes a transfer liquid flow system 702 and a control fluid flow system 726. The transfer liquid flow system 702 and the control fluid flow system 726 include an internal transfer liquid channel and an internal control fluid channel, respectively, which are formed in the body of the fluidic chip 756. The transfer liquid channel includes a transfer liquid input channel 730 communicating with a transfer liquid chamber 750, which in turn communicates with a capillary channel 706. The capillary channel 706 extends from the transfer liquid chamber 750 to a capillary channel opening (or tip opening) 718 at the capillary tip 714. The control fluid channel includes a control fluid input channel 762 communicating with a control fluid chamber 764. Generally, the transfer liquid chamber 750 and the control fluid chamber 764 have shapes and sizes appropriate for their functions, as described below. The transfer liquid chamber 750 and the control fluid chamber 764 may have flow areas and/or volumes that are larger than their respective input channels. A flexible diaphragm 776 provides a common boundary interposed between and separating the transfer liquid chamber 750 and the control fluid chamber 764.

The transfer liquid flow system 702 further includes a transfer liquid reservoir and flow source 772 communicating with the transfer liquid input channel 730, which may be via a valve 744 (e.g., an open/close valve), as indicated by respective arrows in FIG. 7A. The transfer liquid reservoir and flow source 772 is configured for providing both transfer liquid and controlled pressure or transfer liquid flow. The valve 744 may control liquid flow to the transfer liquid input channel 730. The control fluid flow system 726 further includes a control fluid reservoir and pressure source 766 configured for flowing a suitable control fluid (gas or liquid) into the control fluid chamber 764. In this manner, the control fluid pressurizes the control fluid chamber 764, thereby deforming (or displacing) the flexible diaphragm 776 toward the transfer liquid chamber 750. Hence, as the volume of the control fluid chamber 764 expands the volume of the transfer liquid chamber 750 decreases, thereby causing transfer liquid to be extruded from the transfer liquid chamber 750 or, upon release of the pressure in the control fluid chamber 764 and attendant decrease of volume, drawn into the transfer liquid chamber 750 (via the capillary channel 706 and capillary channel opening 718) as desired.

In some embodiments, the valve 774 may be integrated with the fluidic chip 756. For example, the valve 744 may be configured as a flexible diaphragm that selectively closes off (i.e., by creating a pinch in) the transfer liquid input channel 730 in response to an appropriately routed input of control fluid.

Thus, the metered active capillary system 700 is differentiated from the non-metered active capillary system 600 described above and illustrated in FIGS. 6A-6E, in that the transfer liquid is provided separately from the capillary tip 714 and is provided to the capillary tip 714 from within the transfer element (the fluidic chip 756). Further, the metered active capillary system 700 is differentiated by the controlled extrusion of the transfer liquid. Rather than just applying an upstream pressure directly to the transfer liquid, the metered active capillary system 700 uses a flexible diaphragm 766 to physically displace the transfer liquid such that it extrudes from the capillary tip 714. The metered active capillary system 700 is capable of controlling the amount of transfer liquid extruded by controlling the amount of displacement of the flexible diaphragm 776, which displacement is controlled by the amount of pressure applied by the control fluid reservoir and pressure source 766.

Figures 7C, 7D:
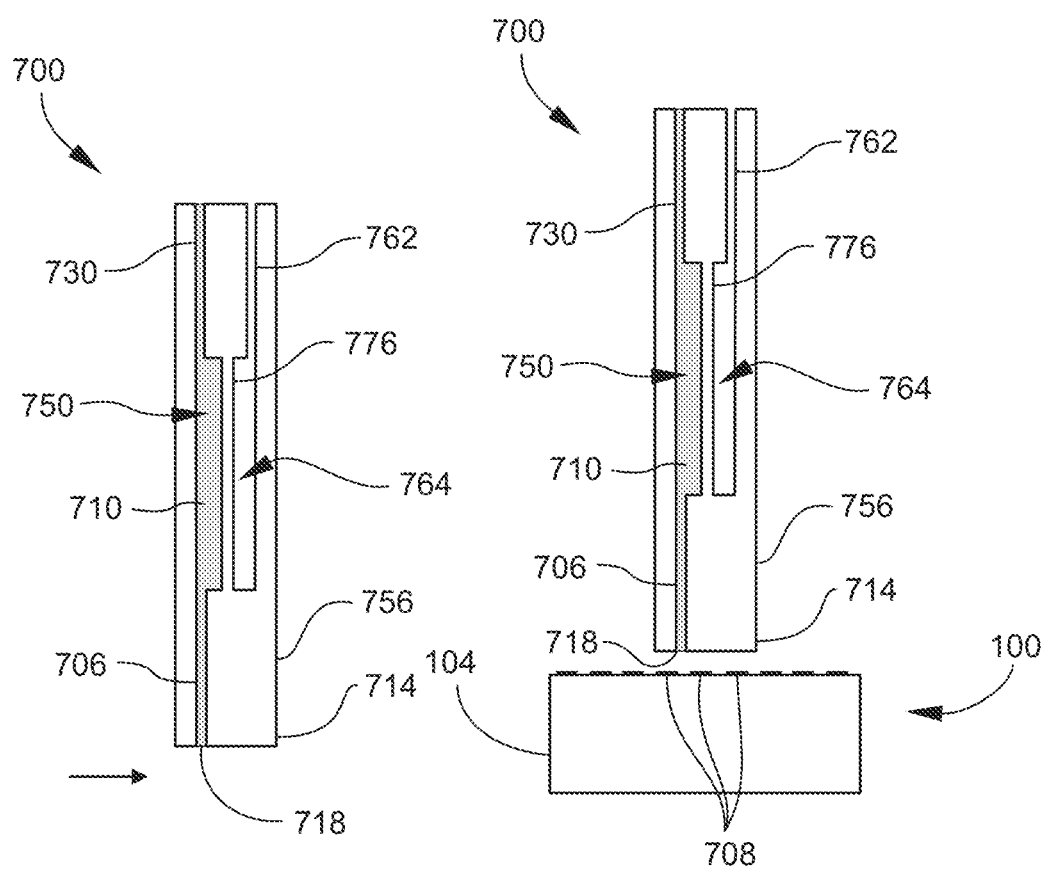

FIGS. 7B-7G illustrate a sequence of steps of an example of a method for transferring material 708 from a source array 100 (FIGS. 7B-7F) to a destination array 200 (FIG. 7G) according to an embodiment. Referring to FIG. 7B, transfer liquid 710 is pushed from the transfer liquid reservoir and flow source 772, through the valve 744, through the transfer liquid input channel 730, through and filling the transfer liquid chamber 750, through the capillary channel 706, and to the capillary channel exit 718. This priming process may result in a small excess 778 of transfer liquid 710 being pushed out from the capillary channel exit 718. Referring to FIG. 7C, the excess 778 of transfer liquid 710 may be removed by applying a flow (e.g., burst) of gas to the capillary tip 714 from a source outside of the fluidic chip 756 as indicated by an arrow, or by touching the face of the capillary tip 714 to an absorbent surface. Referring to FIG. 7D, the fluidic chip 756 is then moved to the source array 100 and aligned directly above a selected cluster containing materials 708. The capillary tip 714 is then lowered to a short, non-zero distance (e.g., 0 to 100 µm or more) from the surface of the source array 100. At this stage, the valve 744 that controls the flow of transfer liquid 710 is closed, whereby the capillary channel opening 718 becomes the sole exit for transfer liquid 710 from the system.

Figure 7E:
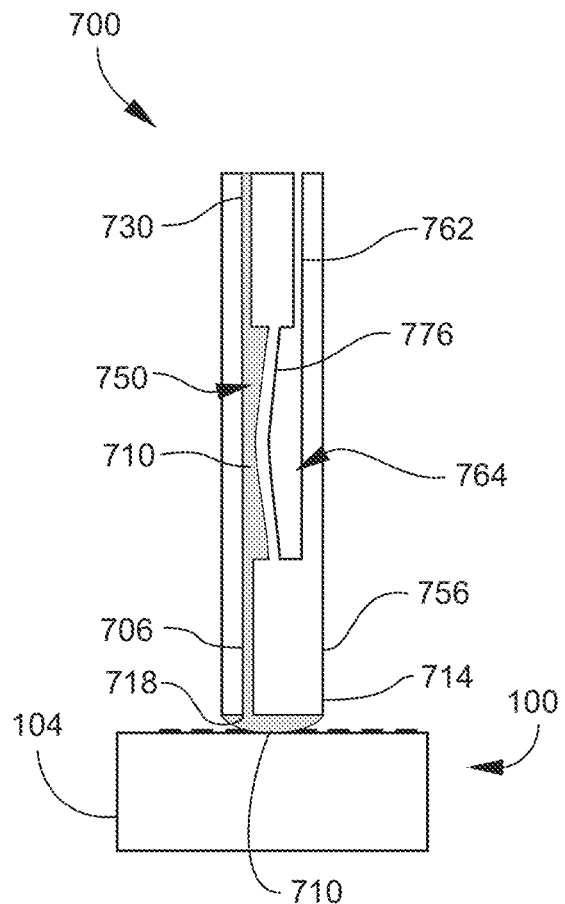
Figure 7F:
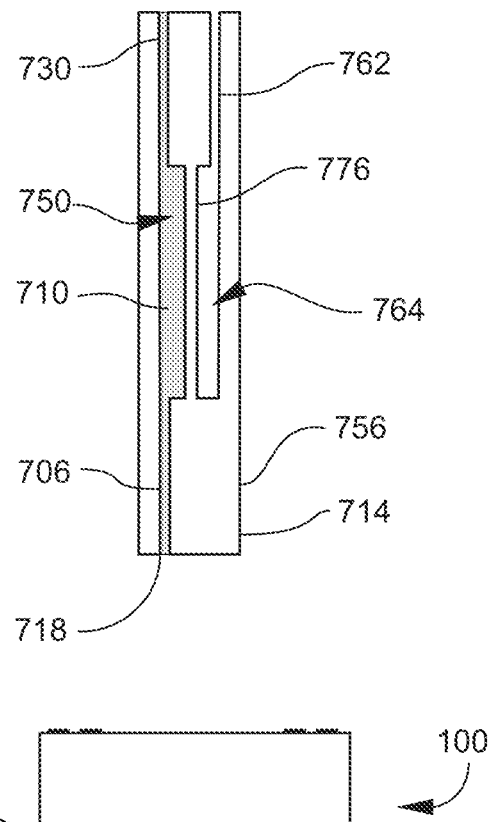
Figure 7G:
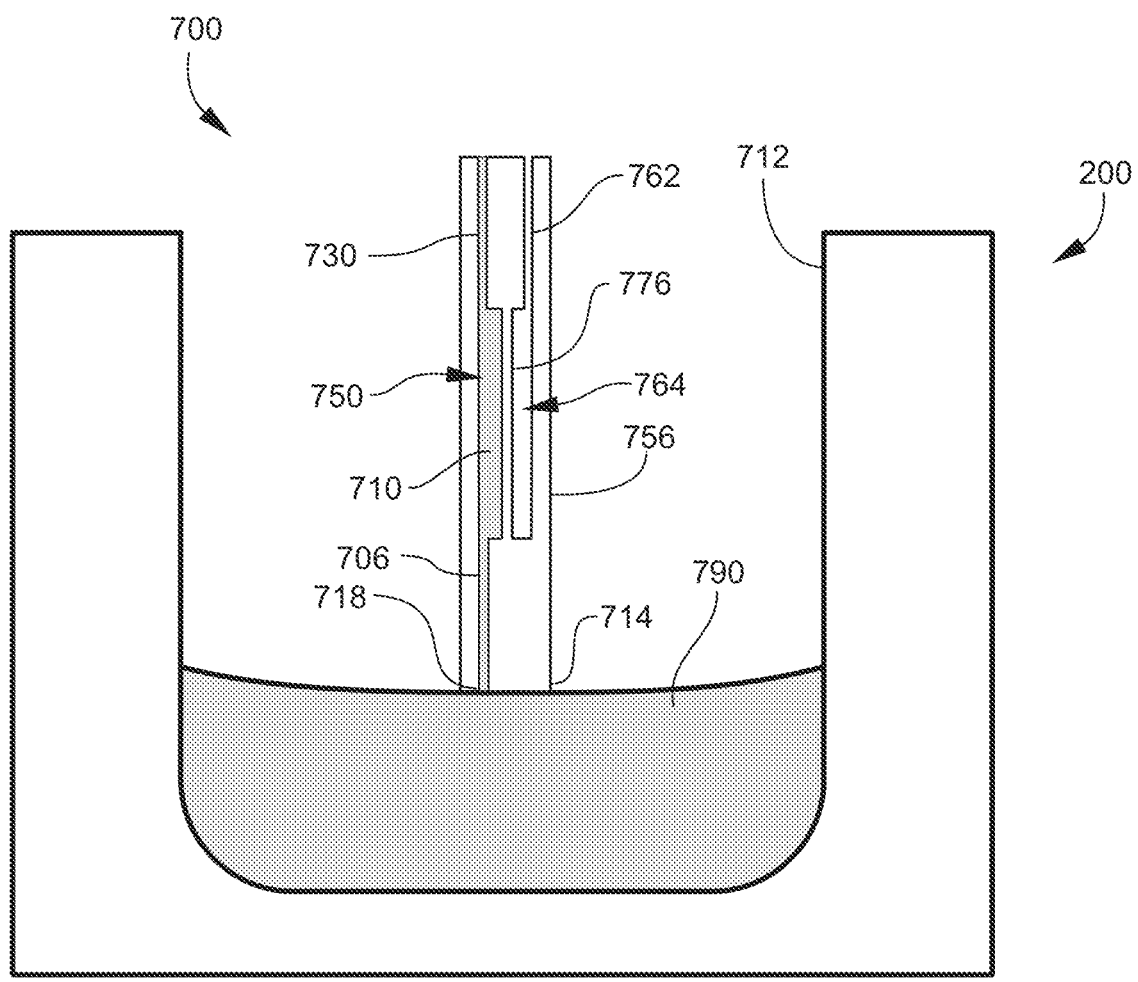

Referring to FIG. 7E, pressure is then applied from the control fluid reservoir and pressure source 766 to the control fluid chamber 764 which, in turn, causes the flexible diaphragm 776 to deform, thereby decreasing the volume of the transfer liquid chamber 750 and extruding an equal volume of transfer liquid out from the capillary channel opening 718. This extruded transfer liquid is contained by and contacts both the face of the capillary tip 714 and the targeted cluster. The materials 708 contained within the features comprising the cluster may thus go into solution within the transfer liquid 710. Referring to FIG. 7F, the pressure applied by the control fluid reservoir and pressure source 766 is then released and the transfer liquid 710 that had been extruded (now containing the materials 708) is then pulled back into the capillary channel 706 and transfer liquid chamber 750. An extension to this process comprises loading additional materials into the transfer fluid within the transfer liquid chamber 750 from additional clusters, using the process described above, before proceeding further. In this manner, materials from multiple clusters are transferred to a single destination address using only a single transfer action. Referring to FIG. 7G, the fluidic chip 756 is then moved to the destination array 200 and lowered to the destination address. Again in the present example, the destination address is a well 712 of a multi-well plate. The valve 744 is then opened and liquid flow is initiated through the transfer liquid flow system 702, thereby pushing the transfer liquid 710 containing the materials 708 in solution out from the capillary channel opening 718 and into the well 712. One or more other liquids 790 (e.g. reagent solution, etc.) may be added to the well 712 before or after dispensing the transfer liquid 710 into the well 712, as described elsewhere herein.

Alternatively, the valve 774 may remain closed and the control fluid reservoir and pressure source 766 may be utilized to extrude the transfer liquid 710 containing the materials 708 out from the capillary channel opening 718. This alternative method is only capable of extruding the maximum amount of transfer liquid 710 that activation of the flexible diaphragm 766 can provide. By comparison, opening the valve 744 and activating the transfer liquid reservoir and flow source 772 to extrude the transfer liquid 710 may provide any desired amount of transfer liquid 710, and is generally limited only by the amount of transfer liquid 710 present in the transfer liquid reservoir and flow source 772.

It will be understood that, as in other embodiments disclosed herein, multiple capillary tips 714 (with corresponding groups of transfer liquid chambers 750, control fluid chambers 764, flexible diaphragms 776, etc.) may be provided as an array of transfer elements carried by a single transfer element head (e.g., the transfer element head 352 described above and illustrated in FIG. 3), thereby enabling parallel processing of multiple clusters of materials 708. In such a case, a single fluidic chip 756 may include multiple capillary tips 714, and FIGS. 7A-7G may be considered as cross-sectional side views of the fluidic chip 756.

Figure 8:
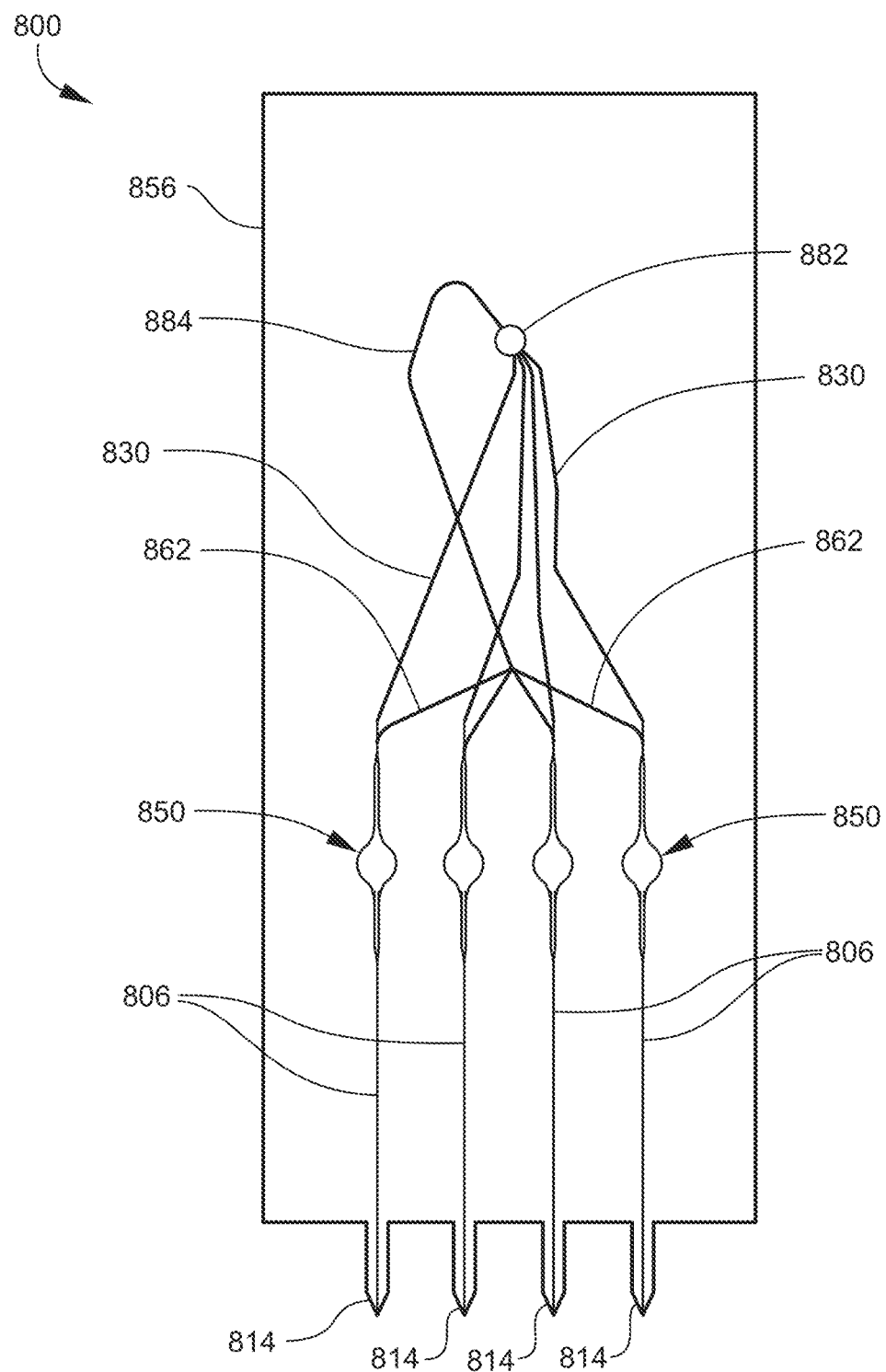
FIG. 8 is a schematic plan view of an example of a metered active capillary device or system that includes a plurality of transfer elements, according to an embodiment.

FIG. 8 is a schematic plan view of an example of a multi-channel, metered active capillary device or system 800 that includes a plurality of transfer elements, according to an embodiment. In this embodiment, the transfer elements are embodied in a fluidic chip 856. The fluidic chip 856 includes a body of material that terminates at a plurality of capillary tips 814. The fluidic chip 856 is part of a fluid-based control system that includes a transfer liquid flow system and a control fluid flow system, which are not shown in FIG. 8 but may be similar to the transfer liquid flow system 702 and the control fluid flow system 726 described above and illustrated in FIG. 7A. The fluidic chip 856 includes a plurality of internal transfer liquid channels and internal control fluid channels extending between and communicating with a fluid flow selector (or switch) 882 and the capillary tips 814. Each transfer liquid channel includes a transfer liquid input channel 830 communicating with a corresponding transfer liquid chamber 850, which in turn communicates with a corresponding capillary channel 806. Each capillary channel 806 extends from the transfer liquid chamber 850 to a capillary channel opening of a corresponding capillary tip 814. In the illustrated embodiment, the transfer liquid input channels 830 each communicate directly with a common flow path that is part of the fluid flow selector 882. Alternatively, the transfer liquid input channels 830 may each branch off of a single, common transfer liquid supply channel (not shown) that communicates directly with a flow path of the fluid flow selector 882.

Each control fluid channel includes a control fluid input channel 862 communicating with a control fluid chamber. From the perspective of FIG. 8, the control fluid chambers are the same size as and underneath the corresponding transfer liquid chambers 850 and thus are not visible. Flexible diaphragms (also not visible) separate corresponding pairs of transfer liquid chambers 850 and control fluid chambers, as described above and illustrated in FIGS. 7A-7G. In the illustrated embodiment, the control fluid input channels (or sub-channels) 862 branch off of a single, common control fluid supply channel 884 that communicates directly with a flow path of the fluid flow selector 882. Alternatively, the control fluid input channels 862 may each communicate directly with a common flow path of the fluid flow selector 882 in a manner similar to the illustrated transfer liquid input channels 830.

In the present embodiment, the fluid flow selector 882 is configured as a switch that can be actuated to move between a first operating position at which transfer liquid is supplied to the transfer liquid input channels 830 and a second operating position at which control fluid is supplied to the control fluid input channels 862. In one specific yet non-limiting embodiment, the fluid flow selector 882 may be configured as a small-scale rotary multi-port valve. In this case, the fluid flow selector 882 may include a stator and an adjacent rotor. The stator may include a plurality of ports, and the rotor may include a plurality of internal flow paths (e.g., channels, grooves, etc., between the sides of the rotor and stator that face other). Each flow path of the rotor has a length, and is positioned relative to the ports of the stator, such that at any operating position of the fluid flow selector 882, the flow path fluidly couples two of the ports (whereby one of the ports serves as an inlet port and the other port serves as an outlet port). Rotation of the rotor may be driven by any suitable mechanism. Generally, the operation of the fluid flow selector 882 may be similar to that of larger-scale rotary multi-port valves utilized in applications requiring the switching of fluid flow paths, such as chromatography.

In the present embodiment, one of the ports (a transfer liquid supply port) of the stator is coupled to the transfer liquid source, and another port (a control fluid supply port) is coupled to the control fluid source. When rotated to the first operating position, the fluid flow selector 882 couples (via one of the flow paths) the transfer liquid supply port to multiple outlet ports, each communicating with one of the transfer liquid input channels 830. At the first operating position, the control fluid supply port is blocked, i.e., the control fluid supply channel 884 and control fluid input channels 862 are decoupled from the control fluid source. When rotated to the second operating position, the fluid flow selector 882 couples (via one of the flow paths) the control fluid supply port to an outlet port communicating with the control fluid input channels 862. At the second operating position, the transfer liquid supply port is blocked, i.e., the transfer liquid input channels 830 are individually decoupled from the transfer liquid source and there is no communication between the individual transfer liquid input channels 830.

Generally, the multi-channel, metered active capillary system 800 may be operated in a manner similar to the metered active capillary device or system 700 described above and illustrated in FIGS. 7A-7G. The fluid flow selector 882 is switched between the first and second operating positions as needed for priming the fluidic chip 856 with transfer fluid, drawing materials from selected clusters 116, 216 into solution with the transfer fluid into corresponding transfer liquid chambers 850, transferring the materials from a source array 100 to a destination array 200, and extruding the material-containing transfer fluids from corresponding capillary tips 814.

According to further embodiments of the present disclosure, the materials transferred from the source array 100 to the destination array 200 are oligos or larger compounds containing multiple oligos (e.g., synthons). Thus, the source array 100 may be an organized collection of a potentially very large number of oligos, which populate features 108 and clusters 116 as described herein. The source array 100 containing oligos may be created (i.e., features 108 containing oligos may be created) by in situ synthesis, i.e., the oligos may be synthesized directly on the source array 100. Alternatively, the source array 100 may be created by ex situ synthesis followed by hybridization to the source array 100. That is, the oligos first may be synthesized on a separate support structure (e.g., a separate glass slide) that is located off-site from the source array 100. The oligos may then be released from the off-site support structure and hybridized to capture probes attached to the source array 100. The capture probes may be arranged on the source array 100 according to the predetermined organization of feature addresses. Depending on the stage of a method utilizing an oligo source array, the oligos located at the features 108 may be bound to or unbound (released) from the features 108.

As in the case of other (bio)chemical compounds, the oligos may be processed in accordance with any desired method. In particular, different combinations of oligos may be selected for assembly into different types of synthons. For example, the source array 100 may be organized or mapped into multiple sets (groups or sub-collections) of oligos. Each oligo set may include all of the oligos required to assemble a particular type of synthon. Depending on how the source array 100 is created, assembly may be performed at the source array 100 after which the assembled synthons are transferred to the destination array 200, or precursor oligos may be transferred to the destination array 200 after which assembly is performed at the destination array 200. In either case, potentially thousands to millions of synthons and thus thousands to millions of genes or other nucleic acid sequences may be synthesized from an oligo collection provided on a single source array 100. According to an aspect of the present disclosure, complex oligo collections are able to be sorted into sub-collections, and oligos are able to be selectively extracted from the sub-collections for subsequent processing such as assembly into synthons.

Each feature 108 of the source array 100 may contain a large number of oligos. Depending on the embodiment, each feature 108 of a given cluster 116 may contain the same type of oligos, or the features 108 of the cluster 116 may contain different types of oligos. Oligos of the same type contain the same sequence of nucleotides (nucleotide monomers), whereas oligos that are "different" contain different sequences of nucleotides. A given cluster 116 may contain the same combination of oligos as another cluster 116, or different clusters 116 may contain different combinations of oligos. For convenience in the present disclosure, oligos having different sequences may be considered as being an example of materials having different compositions.

An example of a method for processing oligos will now be described. In this example, a source array 100 is created by synthesizing oligos on the surface of the source array 100, such that each oligo is attached to the surface through a cleavable linker. The oligos are synthesized so as to create an array of addressable features 108 on the surface. Each feature 108 of the array contains the same type of oligo on that particular feature 108, while different features 108 of the array may contain different oligos. The oligos are synthesized in such a way that the features 108 are grouped into separate clusters 116. Each cluster 116, or set of clusters 116, contains all of the oligos needed to assemble a particular synthon (having a particular sequence of oligos). Direct synthesis may be performed, for example, by drop deposition from pulse jets or by pin deposition of nucleotide units, or by photolithographic techniques. Protected oligos are then de-protected and released (e.g., cleaved) from the support structure surface, either stepwise or simultaneously, by any suitable technique. In some cases, washing of the source array 100 may be performed to remove de-protection salts and side products without removing the oligos. Any suitable wet-cleaving, dry-cleaving (e.g., using a gas-phase cleaving agent), or photocleaving mechanism may be utilized, such as those described in U.S. Patent Application Publication Nos. US 2015/0361423 and US 2015/0361422, both titled HIGH THROUGHPUT GENE ASSEMBLY IN DROPLETS, the contents of both of which are incorporated by reference herein. Before or after releasing oligos of the source array 100, one or more clusters 116 needed to assemble one or more desired synthons are selected. The transfer device 338 may then be utilized in the manner described above to transfer the oligos located at the selected cluster(s) 116 to one or more chambers 212 (or other type of destination sites) of a destination array 200.

At the chamber(s) 212, the oligos are contacted with one or more appropriate reagents (added to the chamber(s) 212 before or after transferring the oligos), whereby one or more types of synthons are assembled in a desired order of oligos at one or more chambers 212. Examples of reagents include, but are not limited to, polymerase, ligase, endonuclease, exonuclease, other enzymes or coenzymes, adenosine triphosphate (ATP), other nucleotide triphosphates (NTPs) or deoxy-NTPs (dNTPs), other nucleotide derivatives, nucleotides, and buffer. Also, any particular reaction conditions (e.g., temperature program, time) required to assemble the synthons are implemented at the chambers 212, as appreciated by persons skilled in the art. For example, the destination array 200 may be loaded into an incubation chamber if needed. More generally, various techniques may be utilized to assemble synthons from the oligos of respective oligo sets, as appreciated by persons skilled in the art. Examples include, but are not limited to, polymerase chain assembly (PCA) and ordered ligation, as further described in above-referenced U.S. Patent Application Publication Nos. US 2015/0361423 and US 2015/0361422.

Another example of a method for processing oligos will now be described. In this example, a source array 100 is provided or created initially as a capture array. The capture array contains a plurality of capture probes (nucleotide sequences) attached to the surface according to the predetermined organization of feature addresses. The capture probes are located such that each feature 1008 (FIG. 10) of the capture array contains the same type of capture probe. That is, each feature 1008 contains capture probes that have the same capture sequence on that particular feature 1008. Different features of the capture array may contain the same or different capture probes. The oligos utilized to populate the source array 100 and subsequently to assemble synthons are initially provided on a separate support structure (i.e., separate and different from the source array 100). The oligos are distinguished from each other by their respective assembly payloads (nucleotide sequences). While different oligos have different assembly payloads, some oligos having different assembly payloads may have the same capture sequence (or terminal indexer sequence) at their 5' ends. Oligos having the same capture sequence are able to hybridize to the same type of capture probe on the capture array.

In this example, the source array 100 is created (or completed) by drawing the oligos initially provided on the separate support structure into a solution, and then bringing the solution containing the oligo mixture into contact with the capture array. This initiates the hybridization process, whereby oligos having capture sequences complementary to specific capture probes are hybridized to (captured by) those capture probes. Consequently, oligos having the same capture sequences are co-located at the same feature 1008 of the capture array. Oligos co-located at the same feature 1008 may, however, have different assembly payloads.

Figure 10:
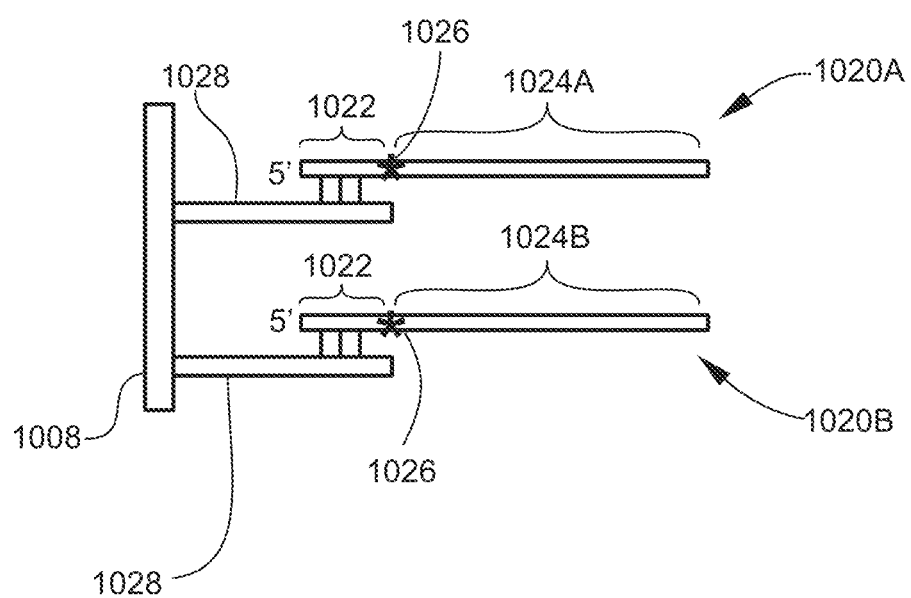
FIG. 10 is a schematic view of an example of a feature occupied by two different oligos according to an embodiment utilizing a capture array.

FIG. 10 is a schematic view of an example of a feature 1008 occupied by two different oligos, namely a first oligo 1020A and a second oligo 1020B, according to an embodiment utilizing a capture array. Additional oligos (not shown) may also be bound to the same feature 1008. Each oligo 1020A, 1020B may be considered as including a capture sequence 1022, an assembly payload (or sequence) 1024A, 1024B, and a cleavable linker 1026 between the capture sequence 1022 and the assembly sequence 1024A, 1024B. Capture probes 1028 are attached to the feature 1008. The capture sequences 1022 are the parts of the oligos 1020A and 1020B that hybridize to the capture probes 1028, as illustrated. On a given feature 1008 (or cluster of features 1008), the capture probes 1028 are the same (have the same molecular composition and structure). Consequently, when a mixture of oligos is brought into contact with the capture array, oligos having the same capture sequence 1022 will be captured by the capture probes 1028 and not by different capture probes located at other features 1008. Thus in FIG. 10, the capture sequences 1022 of the first oligo 1020A and the second oligo 1020B are the same, and both are complementary to the capture probes 1028 located at the illustrated feature 1008. Thus, both the first oligo 1020A and the second oligo 1020B will be captured at that location. The first oligo 1020A and the second oligo 1020B differ from one another in the molecular sequences of their respective assembly payloads 1024A and 1024B. It will be noted that for simplicity FIG. 10 illustrates a single first oligo 1020A and a single second oligo 1020B. In practice, a given feature 1008 may contain many oligos of the same type (e.g., two or more first oligos 1020A or two or more second oligos 1020B). Moreover, in practice a given feature 1008 may contain more than two types of oligo. The captured oligos 1020A, 1020B may thereafter be cleaved at their respective linkers 1026, leaving their capture sequences 1022 hybridized to the capture probes 1028 and freeing their assembly payloads 1024A and 1024B. The free assembly payloads 1024A and 1024B may remain in solution at the feature 1008, or if dry-cleaved remain dried down on the feature 1008, until selected for further processing. The free assembly payloads 1024A and 1024B may thereafter be processed to assemble a synthon as described herein.

In this example, a given feature 1008 has all of the different oligos (oligos with different assembly payloads) needed to assemble a particular synthon. To increase the number of oligos available for assembly, a plurality of features 1008 may be grouped into a cluster 116 (FIG. 1B) on the capture array, as described herein. Each feature 1008 that is a member of the same cluster 116 contains the same oligos as the other features 1008 of that same cluster.

One or more clusters 116 needed to assemble one or more desired synthons are selected. The transfer device 338 (FIG. 3) may then be utilized in the manner described above to transfer the cleaved oligos located at the selected cluster(s) 116 to one or more chambers 212 (or other type of destination sites) of a destination array 200. Each transfer element 356 may be sized so as to able to transfer the oligos from all or some features 1008 of a selected cluster 116 at the same time. At the chamber(s) 212, the oligos are contacted with one or more appropriate reagents to assemble one or more types of synthons at one or more chambers 212 as described herein.

In some embodiments, synthon precursor oligos utilized in methods and systems disclosed herein may be described as follows. A first oligo set includes oligos of formula A-X, where A is a capture sequence (terminal indexer sequence) that is common to all of the oligos in the first oligo set, and X is an assembly sequence that is different among the oligos in the first oligo set (e.g., X1, X2, X3, and so on); a second oligo set includes oligos of formula B-Y, where the capture sequence B is common to all of the oligos in the second oligo set and is different to A, and the assembly sequence Y is different among the oligos in the second oligo set (e.g., Y1, Y2, Y3, and so on); and so on. The X oligos may be assembled into a first synthon that includes a first synthon sequence in a defined order (e.g., X1-X2-X3- . . . ), the Y oligos may be assembled into a second synthon that includes a second synthon sequence in a defined order (e.g., Y1-Y2-Y3- . . . ), and so on.

The above-described methods for processing oligos are useful when it is desired to capture or synthesize the oligos on an array, but then remove them from the array for further processing, rather than assembling them in droplets in situ on the surface of the array as described in above-referenced U.S. Patent Application Publication Nos. US 2015/0361423 and US 2015/0361422. For example, if the assembly process includes multiple enzymatic steps requiring different buffers and/or reagents, it may be more convenient to perform such steps at a separate assembly site (e.g., at a destination array as described herein) rather than directly on the array where the oligos were captured or synthesized.

In other applications, however, assembly on the source array 100 may be desirable. Accordingly, in another example of a method for processing oligos, a source array 100 is created from a capture array as just described. The present example differs in that after hybridization and cleaving, synthons are assembled directly on the source array 100. This may be done in a preferred embodiment, for example, by placing or creating droplets containing reagent(s) on one or more selected features 108 of the source array 100, thereby initiating the assembly process at the selected feature(s) 108. In this way, synthons are assembled directly within each selected feature 108 on the source array 100. The source array 100 is then dried, and the transfer device 338 may then be utilized to transfer the synthons to destination array 200 for further processing, storage, transport, etc.

Alternatively, in another example of a method for processing oligos, a source array 100 is created from a capture array as just described. After hybridization and cleaving, synthons are assembled directly on the source array 100. This may be done by placing or creating droplets containing reagent(s) over the whole of one or more selected clusters 116 of the source array 100, thereby initiating the assembly process at the selected cluster(s) 116. In this way, synthons are assembled directly from the features 108 within each cluster 116. The source array 100 is then dried, and the transfer device 338 may then be utilized to transfer the synthons to a destination array 200 for further processing, storage, transport, etc.

In some embodiments, methods described herein may utilize one or more aspects of methods for hybridizing an oligonucleotide mixture to an array using capture probes disclosed in above-referenced U.S. Patent Application Publication Nos. US 2015/0361423 and US 2015/0361422.

Synthons assembled according to the methods disclosed herein may be further processed for any pertinent purpose. For example, the synthons may be utilized to synthesize genes or other larger polynucleotide-based constructs. The synthons may be extracted from the chambers 212 and utilized to create an array of synthons, which may serve as an intermediate product for further processing or otherwise stored for later use.

From the present disclosure, it is evident that the disclosed systems and methods may provide one or more advantages. The addressability of the source array, which may be potentially large and complex, enables selective extraction of liquids or materials, including (bio)chemical compounds, for any pertinent purpose. In the case of processing oligos, amplification is not required. The ability to extract materials or liquids (or sets of materials or liquids) from the source array and transfer them to separate destination sites, such as may be conveniently provided by a multi-well plate of standard format or other environment separate and isolated from the source array, affords a high degree of flexibility in the further processing of the selected liquids or materials. For instance, the further processing of the selected materials or liquids is not constrained by the environment of the source array, and ensures that any further processing will have no adverse effect on (and thus need not account for) the source array. Instead, the further processing may be implemented by a wide variety of further processing steps, which may include for example multiple enzymatic steps requiring different reagents and buffers. Moreover, processing conditions may be optimized, as such processing may be carried out at destination sites separate and isolated from the source array. Moreover, thousands or millions of materials or liquids may be provided on the source array. Hence, depending on the number of destination sites provided, the systems and methods disclosed herein may enable the processing of thousands or millions of liquids or materials of the same composition or different compositions in a massively parallel operation.

Figure 11:
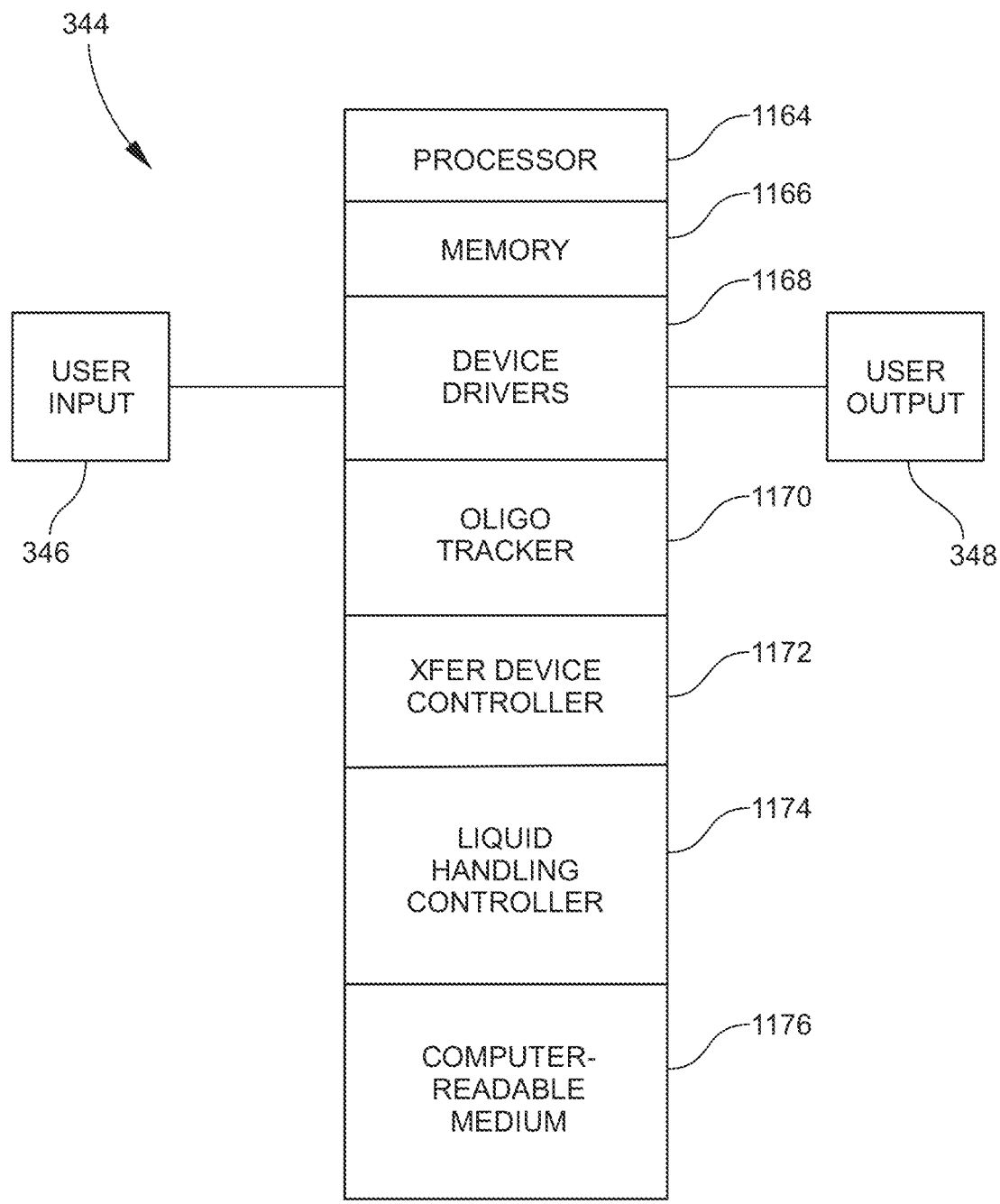
FIG. 11 is a schematic view of an example of a system controller according to an embodiment.

FIG. 11 is a schematic view of a further non-limiting example of the system controller 344 described above and illustrated in FIG. 3. The system controller 344 typically includes an electronics-based processor 1164, which may be representative of a main electronic processor (e.g., a central processing unit or CPU) providing overall control, and one or more electronic processors configured for dedicated control operations or specific signal processing tasks (e.g., a digital signal processor or DSP, an application-specific integrated circuit or ASIC, a field-programmable gate array (FPGA), a graphics processing unit or GPU, etc.). The system controller 344 also typically includes one or more memories 1166 (volatile and/or non-volatile types) for storing data and/or software. The system controller 344 may also include one or more device drivers 1168 for controlling one or more types of user interface devices (user input devices 346 and user output devices 348) and providing an interface between the user interface devices and components of the system controller 344 communicating with the user interface devices. The system controller 344 may also include one or more types of computer programs or software contained in memory and/or on one or more types of computer-readable media. Computer programs or software may contain instructions (e.g., logic instructions) for controlling or performing all or part of any of the methods disclosed herein. Computer programs or software may include system software and application software. System software may include an operating system (e.g., a Microsoft Windows® operating system) for controlling and managing various functions of the system controller 344, including interaction between hardware and application software. In particular, the operating system may provide a graphical user interface (GUI) displayable via a user output device 348 such as a display screen, and with which a user may interact with the use of a user input device 346 such as a keyboard or pointing device. The system controller 344 may also include one or more components or modules (as may be embodied in hardware, firmware and/or software) for controlling or performing all or part of any of the methods disclosed herein, including formatting data for presentation in graphical form by the GUI. These modules may include a materials tracking module 1170, a transfer device control module 1172, and a liquid handling control module 1174. The system controller 344 may coordinate the operations or functions of the materials tracking module 1170, transfer device control module 1172, and liquid handling control module 1174 as needed for carrying out the methods disclosed herein. The system controller 344 may also include devices for receiving and reading (and optionally writing to) computer-readable media 1176.

The materials tracking module 1170 may be configured for tracking the locations (addresses) of specific materials (and/or sets of materials) at specific features 108, clusters 116 and subarrays 112 of a source array 100, and at specific chambers 212 of a destination array 200 (FIGS. 1A to 3). The materials tracking module 1170 may provide a detailed graphical representation of source arrays 100 and destination arrays 300 on a display screen, utilizing color coding and other visual indicators that aid a user in distinguishing different oligo sets. FIGS. 1A, 1B, and 2 may be considered as being simplified depictions of such graphical representations. The materials tracking module 1170 may enable a user to interact with the graphical representation, such as by zooming in and out, selecting (e.g., clicking on or dragging a window over) specific regions of a source array 100 or destination array 200 to obtain information about materials located in such regions, selecting specific clusters 116 or chambers 212 (or entering specific addresses) to determine the materials located at them, dragging a depiction of a selected cluster 116 to a depiction of a selected chamber 212 (or entering source and destination addresses) to define a desired transfer process, etc. The materials tracking module 1170 may generate a graphical representation of the collection of materials contained on a source array 100 based on data inputted to the system controller 344 by the user or by reading media loaded onto the system controller 344. If the system 300 is also capable of implementing a synthesis or assembly process on the source array 100, the materials tracking module 1170 may utilize the data from that process to generate the graphical representation of the results.

The transfer device control module 1172 may be configured for tracking and controlling the movement of the transfer element head 352 at and between the various stations, including the paths taken from one selected address to another, and the raising and lowering of the transfer element head 352 at selected addresses and various stations. The transfer device control module 1172 may carry out an itinerary of the transfer element head 352 based on pre-programmed instructions or user input, or may calculate the itinerary based on selected materials. For such purposes, the transfer device control module 1172 may utilize data (e.g., identities and addresses of materials) provided by materials tracking module 1170. In some embodiments, the itinerary may be based on the selection of a specific reaction or synthesis to be carried out or other process to be performed on materials provided by the source array 100. For example, a user may input the identity of a desired synthon to the system controller 344. Based on the knowledge of the oligo collection contained on an available source array 100, the transfer device control module 1172 may, in cooperation with the materials tracking module 1170, select a source address or addresses in the oligo collection at which the required oligo set is located, select a destination address at which to transfer the oligo set for assembly into the desired synthon, and set appropriate parameters for movement of the transfer element head 352. The parameters (e.g., velocity and acceleration profiles, paths of travel, etc.) may be set so as to optimize the movement, for example to minimize the total amount of time required to execute the movement.

The liquid handling control module 1174 may be configured for controlling the operation of the liquid handling system and associated non-contact transfer elements 356, which may be done in coordination with the transfer device control module 1172. Alternatively or additionally, the liquid handling control module 1174 may control other liquid handling operations and systems, such as for supplying buffer solution, wash/rinse solution, and reagents.

It will be understood that FIGS. 3 and 11 provide high-level schematic depictions of an example of the system controller 344 and associated components consistent with the present disclosure. Other components may be included as needed for practical implementations, which are not shown but are understood by persons skilled in the art. It will also be understood that the system controller 344 is schematically represented in FIGS. 3 and 11 as functional blocks intended to represent structures (e.g., hardware, circuitry, firmware, software, mechanisms, etc.) that may be provided. The various functional blocks and signal links have been arbitrarily located for purposes of illustration only and are not limiting in any manner. Persons skilled in the art will appreciate that, in practice, the functions of the system controller 344 may be implemented in a variety of ways and not necessarily in the exact manner illustrated in FIGS. 3 and 11 and described herein.

EXEMPLARY EMBODIMENTS

Exemplary embodiments provided in accordance with the presently disclosed subject matter include, but are not limited to, the following:

1. A liquid transfer system, comprising: a source station configured for supporting a source array, the source array comprising a surface and a plurality of materials arranged on the surface according to a predetermined organization of clusters, wherein each cluster comprises one or more features, each feature comprises one or more of the plurality of materials, and each cluster is spaced from adjacent clusters by an area unoccupied by materials or occupied by inert materials; a destination station configured for supporting a destination site positioned remotely from the source station; a transfer device comprising a transfer element configured for supporting liquid; and a controller configured for: loading liquid to the transfer element; moving the transfer device to a selected cluster of the source array; operating the transfer device to simultaneously transfer the materials located at the features of the selected cluster from the surface to the transfer element, wherein the materials are carried in the liquid supported by the transfer element; moving the transfer device to the destination site; and transferring the materials from the transfer element to the destination site.

2. The liquid transfer system of embodiment 1, wherein: the selected cluster of the source array is a selected first cluster at which a first set of materials is located; and the controller is configured for: after transferring the first set of materials to the destination site, moving the transfer device back to the source array and to a selected second cluster on the surface at which a second set of materials is located; operating the transfer device to transfer the second set of materials from the surface to the transfer element; moving the transfer device back to the destination site at which the first set of materials is located or to a different destination site; transferring the second set of materials from the transfer element to the destination site at which the first set of materials is located or to a different destination site; and repeating the foregoing steps zero or more times to transfer zero or more additional materials.

3. The liquid transfer system of embodiment 1, wherein: the selected cluster of the source array is a selected first cluster at which a first set of materials is located; the destination station is configured for supporting a plurality of destination sites; the transfer device comprises a plurality of transfer elements configured for supporting a plurality of liquids; and the controller is configured for: operating the transfer device to transfer the first set of materials, and one or more additional sets of materials located at one or more additional clusters, to the respective transfer elements; moving the transfer elements to the plurality of destination sites simultaneously; and transferring the first set of materials and the one or more additional sets of materials from the transfer elements to respective destination sites.

4. The liquid transfer system of any of the preceding embodiments, wherein each cluster comprises two or more features.

5. The liquid transfer system of any of the preceding embodiments, wherein the features in each cluster are arranged as a hexagonal pattern, or a concentric circular pattern, or a rectilinear pattern.

6. The liquid transfer system of any of the preceding embodiments, wherein: the plurality of clusters is organized on the surface as a one-dimensional or two-dimensional array of subarrays, such that each cluster in each subarray is spaced from another cluster in an adjacent subarray by a subarray pitch; and the transfer device comprises a one-dimensional or two-dimensional array of transfer elements configured for supporting a plurality of liquids, and each transfer element is spaced from an adjacent transfer element by a distance substantially equal to the subarray pitch.

7. The liquid transfer system of embodiment 6, wherein the subarray pitch is substantially equal to 9.0 mm, or 4.5 mm, or 2.25 mm.

8. The liquid transfer system of any of the preceding embodiments, wherein: the destination station is configured for supporting a plurality of destination sites; the controller is configured for moving the transfer device to a selected one of the destination sites; and the controller is configured for transferring the materials from the transfer element to the selected destination site.

9. The liquid transfer system of embodiment 8, wherein the destination sites have respective addresses, and the controller is configured for moving the transfer device to a selected address of the destination sites.

10. The liquid transfer system of any of the preceding embodiments, wherein the destination station is configured for supporting a plurality of destination sites having a configuration selected from the group consisting of: the plurality of destination sites is a one-dimensional or two-dimensional array of destination sites; the plurality of destination sites is a two-dimensional array of chambers, and the number of destination sites is 96, or 384, or 1536; the plurality of destination sites is a two-dimensional array of destination sites, and each destination site is spaced from an adjacent destination site by a distance substantially equal to 9.0 mm, or 4.5 mm, or 2.25 mm; the destination sites are chambers; and the destination station is configured for supporting a microtiter plate, and the destination sites are wells of the microtiter plate.

11. The liquid transfer system of any of the preceding embodiments, wherein the transfer element is selected from the group consisting of: a pin comprising a pin tip surface and configured for supporting liquid on the pin tip surface; a pin comprising a pin tip opening and an internal conduit communicating with the pin tip opening, and configured for drawing liquid through the pin tip opening and into the internal conduit; a capillary comprising a capillary channel and a capillary tip opening communicating with the capillary channel, and configured for drawing liquid into the capillary channel via the capillary tip opening; and a capillary comprising a capillary channel, a capillary tip opening communicating with the capillary channel, and a liquid inlet communicating with the capillary channel, wherein the capillary is configured for receiving liquid into the capillary channel via the liquid inlet and drawing liquid into the capillary channel via the capillary tip opening.

12. The liquid transfer system of any of embodiments 1-10, wherein the transfer element comprises a pin, and the controller is configured for operating the transfer device to transfer the materials located at the selected cluster from the surface to the pin by moving the pin with the liquids supported thereon into contact with the materials or with a liquid carrying the materials.

13. The liquid transfer system of any of embodiments 1-10, comprising a controllable pressure source, wherein the transfer element comprises a capillary communicating with the controllable pressure source, and the controller is configured for operating the transfer device to transfer the materials located at the selected cluster from the surface to the capillary by drawing a liquid carrying the materials into the capillary using capillary forces.

14. The liquid transfer system of any of embodiments 1-10, comprising a transfer liquid flow system and a control fluid flow system, wherein the transfer element comprises: a tip opening, a liquid inlet communicating with the transfer liquid flow system, and a liquid chamber communicating with the tip opening and with the liquid inlet; a control fluid chamber communicating with the control fluid flow system; and a flexible diaphragm interposed as a common boundary between the liquid chamber and the control fluid chamber, wherein: the transfer liquid flow system is configured for flowing liquid into the liquid chamber via the liquid inlet; and the control fluid flow system is configured for flowing a control fluid into the control fluid chamber to deform the flexible diaphragm such that the liquid chamber is reduced in volume.

15. The liquid transfer system of embodiment 14, wherein the transfer element comprises a flow selector configured for switching between a first operating position at which the transfer liquid flow system flows liquid into the liquid chamber, and a second operating position at which the control fluid flow system flows control fluid into the control fluid chamber.

16. The liquid transfer system of any of the preceding embodiments, wherein the transfer device comprises a one-dimensional or two-dimensional array of transfer elements configured for supporting a plurality of liquids.

17. The liquid transfer system of embodiment 16, wherein each transfer element is spaced from an adjacent transfer element by a distance substantially equal to 9.0 mm, or 4.5 mm, or 2.25 mm.

18. A method for transferring liquids, the method comprising: providing a source array comprising a surface and a plurality of materials arranged on the surface according to a predetermined organization of clusters, wherein each cluster comprises one or more features, each feature comprises one or more of the plurality of materials, and each cluster is spaced from adjacent clusters by an area unoccupied by materials or occupied by inert materials; selecting a cluster of the source array; loading liquid to a transfer element of a transfer device configured to support the liquid; moving the transfer device to the selected cluster; operating the transfer device to simultaneously transfer the materials located at the features of the selected cluster from the surface to the transfer element, wherein the materials are carried in the liquid supported by the transfer element; moving the transfer device to a destination site positioned remotely from the source array; and transferring the materials from the transfer element to the destination site.

19. The method of embodiment 18, wherein the selected cluster of the source array is a selected first cluster at which a first set of materials is located, and further comprising: after transferring the first set of materials to the destination site, moving the transfer device back to the source array and to a selected second cluster on the surface at which a second set of materials is located; operating the transfer device to transfer the second set of materials from the surface to the transfer element; moving the transfer device back to the destination site at which the first set of materials is located or to a different destination site; transferring the second set of materials from the transfer element to the destination site at which the first set of materials is located or to a different destination site; and repeating the foregoing steps zero or more times to transfer zero or more additional materials.

20. The method of embodiment 18, wherein: the selected cluster of the source array is a selected first cluster at which a first set of materials is located; the destination site is one of a plurality of destination sites; the transfer device comprises a plurality of transfer elements configured for supporting a plurality of liquids, and further comprising: operating the transfer device to transfer the first set of materials and one or more additional sets of materials located at one or more additional clusters to the respective transfer elements; moving the transfer elements to the plurality of destination sites simultaneously; and transferring the first set of materials and the one or more additional sets of materials from the transfer elements to respective destination sites.

21. The method of any of embodiments 18-20, wherein each cluster comprises two or more features.

22. The method of any of embodiments 18-21, wherein the features in each cluster are arranged as a hexagonal pattern, or a concentric circular pattern, or a rectilinear pattern.

23. The method of any of embodiments 18-22, wherein: the plurality of clusters is organized on the surface as a one-dimensional or two-dimensional array of subarrays, such that each cluster in each subarray is spaced from another cluster in an adjacent subarray by a subarray pitch; and the transfer device comprises a one-dimensional or two-dimensional array of transfer elements configured for supporting a plurality of liquids, and each transfer element is spaced from an adjacent transfer element by a distance substantially equal to the subarray pitch.

24. The method of embodiment 23, wherein the subarray pitch is substantially equal to 9.0 mm, or 4.5 mm, or 2.25 mm.

25. The method of any of embodiments 18-24, wherein the destination site is one of a plurality of destination sites, and further comprising selecting one of the destination sites, wherein: moving the transfer device to the destination site comprises moving the transfer device to a selected one of the destination sites; and transferring the materials from the transfer element to the destination site comprises transferring the material from the transfer element to the selected destination site.

26. The method of any of embodiments 25, wherein the destination sites have respective addresses, and moving the transfer device to a selected one of the destination sites comprises moving the transfer device to a selected address of the destination sites.

27. The method of any of embodiments 18-26, wherein the destination site is one of a plurality of destination sites having a configuration selected from the group consisting of: the plurality of destination sites is a one-dimensional or two-dimensional array of destination sites; the plurality of destination sites is a two-dimensional array of destination sites, and the number of destination sites is 96, or 384, or 1536; the plurality of destination sites is a two-dimensional array of destination sites, and each destination site is spaced from an adjacent destination site by a distance substantially equal to 9.0 mm, or 4.5 mm, or 2.25 mm; the destination sites are chambers; and the destination station is configured for supporting a microtiter plate, and the destination sites are wells of the microtiter plate.

28. The method of any of embodiments 18-27, wherein the transfer element is a pin, and operating the transfer device to transfer the materials located at the selected cluster from the surface to the pin comprises moving the pin into contact with the materials or with a liquid carrying the materials.

29. The method of any of embodiments 18-28, wherein the clusters of the source array are associated with different addresses, and moving the transfer device to the selected cluster programming the address associated with the selected cluster into the transfer device.

30. The method of any of embodiments 18-29, wherein the transfer device comprises a one-dimensional or two-dimensional array of transfer elements configured for supporting a plurality of liquids.

31. The method of embodiment 30, wherein each transfer element is spaced from an adjacent transfer element by a distance substantially equal to 9.0 mm, or 4.5 mm, or 2.25 mm.

32. The method of any of embodiments 18-31, comprising contacting the transferred materials with one or more reagents at the destination site.

33. The method of embodiment 32, wherein contacting the transferred materials with the one or more reagents is done under conditions effective for synthesizing a product at the destination site.

34. The method of any of embodiments 18-33, wherein the materials are (bio)chemical compounds or oligonucleotides.

35. The method of any of embodiments 18-34, wherein the liquids carrying the materials comprise an additive effective for suppressing evaporation of the liquid.

36. The method of embodiment 35, wherein additive is selected from the group consisting of: glycerol; sugar alcohols; polyethylene glycol; dimethyl sulfoxide, a salt solution; and a combination of two or more of the foregoing.

37. The method of any of embodiments 18-36, comprising, after providing the source array, ascertaining locations of the clusters on the source array.

38. The method of embodiment 37, wherein ascertaining locations comprises flowing a humid gas onto the source array.

39. A method for processing (bio)chemical compounds, the method comprising: providing a plurality of (bio)chemical compounds, wherein one or more of the (bio)chemical compounds are different in composition from the other (bio)chemical compounds; creating a source array comprising a plurality of features by positioning a plurality of (bio)chemical compounds on a first support structure, wherein one or more of the (bio)chemical compounds are different in composition from the other (bio)chemical compounds, and the plurality of (bio)chemical compounds is positioned such that: each feature comprises one or more of the (bio)chemical compounds; and the plurality of features is arranged on the first support structure according to a predetermined organization of positions; selecting one or more features; and transferring the (bio)chemical compounds of the one or more selected features to a second support structure, by: moving a transfer element to the one or more selected features; transferring the (bio)chemical compounds of the one or more selected features to the transfer element; moving the transfer element to the second support structure; and transferring the (bio)chemical compounds from the transfer element to the second support structure.

40. The method of embodiment 39, comprising contacting the transferred (bio)chemical compounds with one or more reagents at the second support structure.

41. The method of embodiment 40, wherein contacting the transferred (bio)chemical compounds with the one or more reagents is done under conditions effective for synthesizing a (bio)chemical product from interaction between the transferred (bio)chemical compounds and the one or more reagents, wherein the (bio)chemical product is synthesized at the second support structure.

42. The method of any of embodiments 39-41, wherein: positioning the plurality of (bio)chemical compounds on the first support structure is done such that the plurality of features is organized as a plurality of clusters, each cluster containing one or more of the plurality of features, and each cluster spaced from adjacent clusters by an area unoccupied by materials or occupied by inert materials; selecting the one or more features comprises selecting a cluster containing the one or more selected features; and moving the transfer element to the one or more selected features comprises moving the transfer element to the selected cluster.

43. The method of embodiment 42, wherein the features of each cluster are arranged as a hexagonal pattern, or a concentric circular pattern, or a rectilinear pattern.

44. The method of embodiment 42 or 43, wherein for each cluster, the one or more (bio)chemical compounds located at each feature contained in the cluster are different in composition from the one or more (bio)chemical compounds located at each of the other features contained in the cluster.

45. The method of embodiment 42 or 43, wherein: the (bio)chemical compounds comprise oligonucleotides; each feature comprises one or more of the oligonucleotides; and for each cluster, the one or more oligonucleotides located at each feature contained in the cluster is different from the one or more oligonucleotides located at each of the other features contained in the cluster.

46. The method of embodiment 45, wherein transferring the (bio)chemical compounds of the one or more selected features to the second support structure comprises transferring the oligonucleotides of the selected cluster to the second support structure.

47. The method of embodiment 46, comprising contacting the transferred (bio)chemical compounds with the one or more reagents comprises contacting the transferred oligonucleotides with the one or more reagents, under conditions effective for assembling the transferred oligonucleotides into a synthon or gene.

48. The method of embodiment 46 or 47, wherein: positioning the plurality of (bio)chemical compounds on the first support structure comprises attaching the oligonucleotides to the first support structure; and transferring the (bio)chemical compounds of the one or more selected features to the second support structure comprises cleaving the oligonucleotides of the selected cluster to produce unbound oligonucleotides, followed by transferring the unbound oligonucleotides to the second support structure.

49. The method of any of embodiments 42-48, wherein for each cluster, each feature contained in the cluster has the same (bio)chemical compound or the same combination of different (bio)chemical compounds as the other features contained in the cluster.

50. The method of embodiment 42 or 43, wherein: the (bio)chemical compounds comprise oligonucleotides, the oligonucleotides comprising respective assembly payloads;

and for each cluster, each feature contained in the cluster has the same assembly payload or the same combination of different assembly payloads as each of the other features contained in the cluster.

51. The method of embodiment 50, wherein transferring the (bio)chemical compounds of the one or more selected features to the second support structure comprises transferring the assembly payloads of the selected cluster to the second support structure.

52. The method of embodiment 51, comprising contacting the transferred assembly payloads with one or more reagents, under conditions effective for assembling the transferred assembly payloads into a synthon.

53. The method of embodiment 51 or 52, wherein: the oligonucleotides further comprise respective capture sequences; creating the source array comprises: providing a plurality of capture probes on the first support structure at the predetermined organization of positions, wherein one or more of the capture probes are different in composition from the other capture probes; and wherein positioning the plurality of (bio)chemical compounds on the first support structure comprises hybridizing the oligonucleotides to the plurality of capture probes, wherein the capture sequences specifically bind to complementary capture probes; and transferring the (bio)chemical compounds of the one or more selected features to the second support structure comprises cleaving the oligonucleotides of the selected cluster to produce unbound assembly payloads on each feature of the selected cluster, followed by transferring the unbound assembly payloads to the second support structure, wherein the capture probes remain attached to the first support structure.

54. The method of any of embodiments 42-53, wherein the selected cluster is a selected first cluster, and further comprising: selecting one or more additional clusters; and transferring the (bio)chemical compounds of the one or more selected additional clusters to the second support structure.

55. The method of embodiment 54, comprising contacting the transferred (bio)chemical compounds of the first cluster and the one or more selected additional clusters with one or more reagents at the second support structure, under conditions effective for synthesizing a first (bio)chemical product and one or more additional (bio)chemical products, respectively.

56. The method of embodiment 55, wherein at least one of the (bio)chemical products synthesized is different in composition from the other(bio)chemical products synthesized.

57. The method of any of embodiments 54-56, wherein transferring the (bio)chemical compounds of at least some of the selected additional clusters to the second support structure is done simultaneously using a transfer device comprising a plurality of transfer elements.

58. The method of any of embodiments 54-56, wherein transferring the (bio)chemical compounds of at least some of the selected additional clusters to the second support structure is done sequentially.

59. The method of any of embodiments 54-58, comprising creating a destination array by transferring the (bio)chemical compounds of at least some of the selected clusters to different positions on the second support structure.

60. The method of embodiment 59, wherein the different positions are on a planar surface of the second support structure.

61. The method of embodiment 59 or 60, wherein the second support structure comprises a plurality of chambers, and the different positions are at different chambers.

62. The method of any of embodiments 59-61, wherein: the plurality of clusters are arranged on the first support structure as a one-dimensional or two-dimensional array of subarrays, such that each cluster in each subarray is spaced from another cluster in an adjacent subarray by a subarray pitch; the selected clusters are respectively located in different subarrays; the different positions on the second support structure to which the selected clusters are transferred are spaced from another by a distance substantially equal to the subarray pitch.

63. The method of embodiment 62, wherein the subarray pitch is substantially equal to 9.0 mm, or 4.5 mm, or 2.25 mm.

64. The method of any of embodiments 39-63, wherein the second support structure comprises a plurality of chambers having a configuration selected from the group consisting of: the plurality of chambers is a one-dimensional or two-dimensional array of chambers; the plurality of chambers is a two-dimensional array of chambers, and the number of chambers is 96, or 384, or 1536; the plurality of chambers is a two-dimensional array of chambers, and each chamber is spaced from an adjacent chamber by a distance substantially equal to 9.0 mm, or 4.5 mm, or 2.25 mm; and the second support structure is a microtiter plate, and the plurality of chambers are wells of the microtiter plate.

65. The method of any of embodiments 39-64, wherein: the positions at which the features are located on the first support structure are associated with respective source addresses such that each feature is positioned at a corresponding one of the source addresses; and transferring the (bio)chemical compounds of the one or more selected features to the second support structure comprises controlling movement of the transfer element based on the source address or addresses of the one or more selected features.

66. The method of embodiment 65, wherein: a plurality of destination positions are defined at the second support structure, and further comprising selecting one or more of the destination positions to which to transfer the (bio) chemical compounds; and controlling movement of the transfer element is further based on the one or more destination positions selected.

67. The method of any of embodiments 39-66, wherein: transferring the (bio)chemical compounds of the one or more selected features to the transfer element comprises moving the transfer element into contact with the (bio) chemical compounds of the one or more selected features, wherein the (bio)chemical compounds are drawn into a solution residing on the transfer element; and transferring the (bio)chemical compounds from the transfer element to the second support structure comprises dipping the transfer element into solution disposed at the second support structure.

68. The method of any of embodiments 39-66, wherein: transferring the (bio)chemical compounds of the one or more selected features to the transfer element comprises extruding an amount of solution from the transfer element such that the (bio)chemical compounds are drawn into the extruded solution, and aspirating the extruded solution with the (bio)chemical compounds back into the transfer element; and transferring the (bio)chemical compounds from the transfer element to the second support structure comprises dispensing the extruded solution with the (bio)chemical compounds from the transfer element to the second support structure.

69. A method for processing (bio)chemical compounds, the method comprising: providing a plurality of (bio)chemical compounds, the plurality of (bio)chemical compounds comprising different compositional species; creating a source array comprising a plurality of features by positioning a plurality of (bio)chemical compounds on a first support structure, wherein one or more of the (bio)chemical compounds are different in composition from the other (bio)chemical compounds, and the plurality of (bio)chemical compounds is positioned such that: each feature comprises one or more of the (bio)chemical compounds; and the plurality of features is arranged on the first support structure according to a predetermined organization of known positions; selecting one or more features for use in synthesizing one or more (bio)chemical products; contacting the one or more selected features with one or more reagents, under conditions effective for synthesizing the one or more (bio)chemical products from interaction between the (bio)chemical compounds and the one or more reagents, wherein the one or more (bio)chemical products are synthesized at one or more respective positions on the first support structure; and transferring the one or more synthesized (bio)chemical products to a second support structure by: moving a transfer element to the one or more positions on the first support structure at which the one or more synthesized (bio)chemical products are located; transferring the one or more synthesized (bio)chemical products to the transfer element; moving the transfer element to the second support structure; and transferring the one or more synthesized (bio)chemical products from the transfer element to the second support structure.

70. The method of embodiment 69, wherein: positioning the plurality of (bio)chemical compounds on the first support structure is done such that the plurality of features is arranged as a plurality of clusters, each cluster containing one or more of the plurality of features, and each cluster spaced from adjacent clusters by an area unoccupied by materials or occupied by inert materials; selecting the one or more features comprises selecting one or more clusters containing one or more of the selected features; the one or more (bio)chemical products are synthesized at the one or more selected clusters on the first support structure; and moving the transfer element to the one or more selected features comprises moving the transfer element to the one or more selected clusters.

71. The method of embodiment 70, wherein: the (bio)chemical compounds comprise oligonucleotides, the oligonucleotides comprising respective assembly payloads; and for each cluster, each feature contained in the cluster has the same assembly payload or the same combination of different assembly payloads as each of the other features contained in the cluster.

72. The method of embodiment 71, wherein: the oligonucleotides comprise respective capture sequences; creating the source array comprises: providing a plurality of capture probes on the first support structure at the predetermined organization of positions, wherein one or more of the capture probes are different in composition from the other capture probes; and wherein positioning the plurality of (bio)chemical compounds on the first support structure comprises hybridizing the oligonucleotides to the plurality of capture probes, wherein the capture sequences specifically bind to complementary capture probes; further comprising, before contacting the one or more selected features with one or more reagents, cleaving the oligonucleotides of the one or more selected features to produce unbound assembly payloads, wherein the one or more (bio)chemical products are synthesized by assembling together one or more combinations of the unbound assembly payloads; and after transferring the one or more synthesized (bio)chemical products to the second support structure, the capture probes remain attached to the first support structure.

It will be understood that one or more of the processes, sub-processes, and process steps described herein may be performed by hardware, firmware, software, or a combination of two or more of the foregoing, on one or more electronic or digitally-controlled devices. The software may reside in a software memory (not shown) in a suitable electronic processing component or system such as, for example, the system controller 344 schematically depicted in FIGS. 3 and 11. The software memory may include an ordered listing of executable instructions for implementing logical functions (that is, "logic" that may be implemented in digital form such as digital circuitry or source code, or in analog form such as an analog source such as an analog electrical, sound, or video signal). The instructions may be executed within a processing module, which includes, for example, one or more microprocessors, general purpose processors, combinations of processors, digital signal processors (DSPs), application specific integrated circuits (ASICs), field-programmable gate array (FPGAs), etc. Further, the schematic diagrams describe a logical division of functions having physical (hardware and/or software) implementations that are not limited by architecture or the physical layout of the functions. The examples of systems described herein may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the system controller 344 in FIGS. 3 and 11), direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this disclosure, a computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" or "in electrical communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A liquid transfer system, comprising:
    a source array comprising a surface and a plurality of clusters arranged on the surface and spaced from each other, wherein each cluster comprises a set of features arranged at different locations in the cluster, said locations forming a pattern, and each feature comprises one or more materials such that the cluster comprises a set of materials;
    a destination site positioned remotely from the source array;
    a transfer device comprising a transfer element configured to support liquid; and
    a controller communicating with the transfer device and configured to control the transfer device to perform an operation comprising:
        loading liquid to the transfer element;
        moving the transfer element to a selected cluster of the plurality of clusters of the source array;
        simultaneously transferring the set of materials of the selected cluster to the transfer element, wherein the set of materials is carried in the liquid supported by the transfer element;
        moving the transfer element to the destination site; and
        transferring the set of materials from the transfer element to the destination site.

2. The liquid transfer system of claim 1, wherein:
    the selected cluster of the source array is a selected first cluster, and the set of materials transferred to the destination site is a first set of materials; and
    the controller is configured to control the transfer device to perform the following:
        after transferring the first set of materials to the destination site, moving the transfer element back to the source array and to a selected second cluster of the plurality of clusters, the selected second cluster comprising a second set of materials;
        transferring the second set of materials from the surface to the transfer element;
        moving the transfer element to a second destination site positioned remotely from the source array, the second destination site being the same as or different from the destination site of the first set of materials; and
        transferring the second set of materials from the transfer element to the second destination site.

3. The liquid transfer system of claim 1, wherein:
    the selected cluster of the source array is a selected first cluster, and the set of materials of transferred to the destination site is a first set of materials;
    the destination site is one of a plurality of destination sites positioned remotely from the source array;
    the transfer device comprises a plurality of transfer elements configured to support a plurality of liquids; and
    the controller is configured to control the transfer device to perform the following:
        transferring the first set of materials, and one or more additional sets of materials located at one or more additional clusters of the plurality of clusters, to the respective transfer elements;
        moving the transfer elements to the plurality of destination sites simultaneously; and
        transferring the first set of materials and the one or more additional sets of materials from the transfer elements to respective destination sites.

4. The liquid transfer system of claim 1, wherein:
    the plurality of clusters is organized on the surface as a one-dimensional or two-dimensional array of subarrays, such that each cluster in each subarray is spaced from another cluster in an adjacent subarray by a subarray pitch; and
    the transfer device comprises a one-dimensional or two-dimensional array of transfer elements configured to support a plurality of liquids, and each transfer element is spaced from an adjacent transfer element by a distance matching the subarray pitch.

5. The liquid transfer system of claim 1, wherein:
    the destination site is one of a plurality of destination sites positioned remotely from the source array;
    the controller is configured to control the transfer device to:
        move to a selected one of the destination sites; and
        transfer the set of materials from the transfer element to the selected one of the destination sites.

6. The liquid transfer system of claim 5, wherein the destination sites have respective addresses, and the controller is configured to control the transfer device to move to a selected address of the destination sites.

7. The liquid transfer system of claim 1, wherein the transfer element is selected from the group consisting of:
    a pin comprising a pin tip surface and configured to support liquid on the pin tip surface;
    a pin comprising a pin tip opening and an internal conduit communicating with the pin tip opening, and configured to draw liquid through the pin tip opening and into the internal conduit;

a capillary comprising a capillary channel and a capillary tip opening communicating with the capillary channel, and configured to draw liquid into the capillary channel via the capillary tip opening; and a capillary comprising a capillary channel, a capillary tip opening communicating with the capillary channel, and a liquid inlet communicating with the capillary channel, wherein the capillary is configured to receive liquid into the capillary channel via the liquid inlet and draw liquid into the capillary channel via the capillary tip opening.

8. The liquid transfer system of claim 1, wherein the transfer element comprises a pin, the liquid is loaded on the pin, and the controller is configured to operate the transfer device to transfer the set of materials of the selected cluster from the surface to the pin by moving the pin into contact with the set of materials or with a liquid on the surface carrying the set of materials.

9. The liquid transfer system of claim 1, comprising a controllable pressure source, wherein:

the transfer element comprises a capillary communicating with the controllable pressure source and containing the liquid; and the controller is configured to operate the transfer device to transfer the set of materials of the selected cluster from the surface to the transfer element transfer element by operating the controllable pressure source to extrude a quantity of the liquid from the capillary into contact with the set of materials, and draw the quantity of the liquid with the set of materials into the capillary.

10. The liquid transfer system of claim 1, wherein the transfer device comprises a configuration selected from the group consisting of:

a one-dimensional or two-dimensional array of transfer elements configured to support a plurality of liquids; and a one-dimensional or two-dimensional array of transfer elements configured to support a plurality of liquids, wherein each transfer element is spaced from an adjacent transfer element by a distance substantially equal to 9.0 mm, or 4.5 mm, or 2.25 mm.

11. The liquid transfer system of claim 1, wherein the set of materials is in solid form on the surface, and the transfer elements deliver liquid to the selected cluster to dissolve the set of materials before carrying the set of materials in the liquid.

12. A liquid transfer system, comprising:

a transfer device comprising a transfer element, the transfer element comprising:

a transfer liquid chamber and a capillary channel opening communicating with the transfer liquid chamber;

a control fluid chamber; and a flexible diaphragm interposed as a common boundary between the liquid chamber and the control fluid chamber; and a controller communicating with the transfer device and configured to control the transfer device to perform an operation comprising:

loading transfer liquid into the transfer liquid chamber;

moving the transfer element to a source array comprising a surface and a plurality of clusters arranged on the surface and spaced from each other, wherein each cluster comprises a set of features arranged at different locations in the cluster, said locations forming a pattern, and each feature comprises one or more materials such that the cluster comprises a set of materials, and wherein the transfer element is moved to a selected cluster of the plurality of clusters;

transferring the set of materials of the selected cluster from the surface to the transfer element, by flowing a control fluid into the control fluid chamber to deform the flexible diaphragm such that the transfer liquid chamber is reduced in volume and a quantity of the transfer liquid in the transfer liquid chamber is extruded from the capillary channel opening into contact with the set of materials, wherein the set of materials is carried in the transfer liquid;

moving the transfer element to a destination site positioned remotely from the source array; and transferring the set of materials from the transfer element to the destination site.

13. The liquid transfer system of claim 12, wherein the transfer element comprises:

a transfer liquid input channel communicating with the transfer liquid chamber;

a control fluid input channel communicating with the control fluid chamber; and a flow selector configured to switch between a first operating position at which the transfer liquid flows into the transfer liquid chamber via the transfer liquid input channel, and a second operating position at which the control fluid flows into the control fluid chamber via the control fluid input channel.

14. A method for transferring liquids, the method comprising:

operating the liquid transfer system of claim 1 to perform the following:

loading liquid to the transfer element;

selecting a cluster of the source array;

moving the transfer element to the selected cluster;

simultaneously transferring all materials of the set of materials of the selected cluster from the surface to the transfer element, wherein the materials are carried in the liquid supported by the transfer element;

moving the transfer element to the destination site; and transferring the set of materials from the transfer element to the destination site.

15. The method of claim 14, wherein the selected cluster of the source array is a selected first cluster, and the set of materials transferred to the destination site is a first set of materials of the selected first cluster, and further comprising:

after transferring the first set of materials to the destination site, moving the transfer element back to the source array and to a selected second cluster of the plurality of clusters, the selected second cluster comprising a second set of materials;

transferring the second set of materials from the surface to the transfer element;

moving the transfer element back to the destination site at which the first set of materials is located or to a different destination site positioned remotely from the source array; and transferring the second set of materials from the transfer element to the destination site at which the first set of materials is located or to the different destination site.

16. The method of claim 14, wherein:

the selected cluster of the source array is a selected first cluster, and the set of materials transferred to the destination site is a first set of materials of the selected first cluster;

the destination site is one of a plurality of destination sites positioned remotely from the source array;

the transfer device comprises a plurality of transfer elements configured to support a plurality of respective quantities of a liquid, and further comprising:

transferring the first set of materials and one or more additional sets of materials located at one or more additional clusters of the plurality of clusters to the respective transfer elements;

moving the transfer elements to the plurality of destination sites simultaneously; and transferring the first set of materials and the one or more additional sets of materials from the transfer elements to respective destination sites.

17. The method of claim 14, wherein:

the plurality of clusters is organized on the surface as a one-dimensional or two-dimensional array of subarrays, such that each cluster in each subarray is spaced from another cluster in an adjacent subarray by a subarray pitch; and the transfer device comprises a one-dimensional or two-dimensional array of transfer elements configured to support a plurality of respective quantities of a liquid, and each transfer element is spaced from an adjacent transfer element by a distance matching the subarray pitch.

18. The method of claim 14, wherein the destination site is one of a plurality of destination sites positioned remotely from the source array, and further comprising selecting one of the destination sites, wherein:

moving the transfer device to the destination site comprises moving the transfer device to the selected one of the destination sites; and transferring the materials from the transfer element to the destination site comprises transferring the material from the transfer element to the selected one of the destination sites.

19. The method of claim 18, wherein the destination sites have respective addresses, and moving the transfer device to the selected one of the destination sites comprises moving the transfer device to a selected address of the destination sites.

* * * * *